(12) United States Patent
Anklam et al.

(10) Patent No.: US 11,577,906 B2
(45) Date of Patent: Feb. 14, 2023

(54) BUNDLED PRODUCT AND SYSTEM

(71) Applicant: First Quality Tissue, LLC, Great Neck, NY (US)

(72) Inventors: Chris B. Anklam, Anderson, SC (US); Justin S. Pence, Anderson, SC (US); Byrd Tyler Miller, IV, Easley, SC (US); Amiel Sam Sabbagh, Winchester, VA (US); James E. Sealey, II, Belton, SC (US)

(73) Assignee: FIRST QUALITY TISSUE, LLC, Great Neck, NY (US)

( * ) Notice: Subject to any disclaimer, the term of this patent is extended or adjusted under 35 U.S.C. 154(b) by 0 days.

(21) Appl. No.: 17/499,061

(22) Filed: Oct. 12, 2021

(65) Prior Publication Data

US 2022/0081190 A1 Mar. 17, 2022

Related U.S. Application Data

(63) Continuation of application No. 15/294,305, filed on Oct. 14, 2016, now Pat. No. 11,220,394.
(Continued)

(51) Int. Cl.
*B65D 71/08* (2006.01)
*B65D 85/07* (2017.01)
(Continued)

(52) U.S. Cl.
CPC ............ *B65D 85/07* (2018.01); *B29C 65/224* (2013.01); *B29C 65/745* (2013.01); *B29C 66/0044* (2013.01); *B29C 66/1122* (2013.01); *B29C 66/4312* (2013.01); *B29C 66/73921* (2013.01); *B29C 66/8122* (2013.01); *B29C 66/8246* (2013.01); *B29C 66/83543* (2013.01); *B29C 66/849* (2013.01); *B65B 9/067* (2013.01);
(Continued)

(58) Field of Classification Search
CPC ..... B65B 9/067; B65B 51/303; B65B 25/146; B65D 71/08; B65D 85/62; B65D 75/002; B65D 71/00; B29C 65/224; B29C 65/745; B29C 66/0044; B29C 66/1122; B29C 66/849
USPC ....................................................... 206/391
See application file for complete search history.

(56) References Cited

U.S. PATENT DOCUMENTS 2,919,467 A 1/1960 Mercer
2,926,154 A 2/1960 Keim
(Continued)

FOREIGN PATENT DOCUMENTS

CA 2168894 A1 8/1997
CA 2795139 A1 10/2011
(Continued)

OTHER PUBLICATIONS

International Preliminary Report on Patentability of PCT/US2013/053593 dated Feb. 3, 2015.
(Continued)

*Primary Examiner* — Ernesto A Grano
(74) *Attorney, Agent, or Firm* — Amster, Rothstein & Ebenstein LLP

(57) ABSTRACT

A shippable bundled product including a plurality of paper product rolls each individually packaged by a first package material and arranged relative to one another so as to form a bundle. The bundle is packaged by a second package material. The second package material has a shrinkage factor relative to the bundle of less than zero.

20 Claims, 31 Drawing Sheets

Related U.S. Application Data

(60) Provisional application No. 62/370,128, filed on Aug. 2, 2016, provisional application No. 62/241,554, filed on Oct. 14, 2015.

(51) Int. Cl.

| | | |
|---|---|---|
| *B29C 65/00* | (2006.01) | |
| *B65B 51/30* | (2006.01) | |
| *B65B 25/14* | (2006.01) | |
| *B29C 65/74* | (2006.01) | |
| *B65D 75/00* | (2006.01) | |
| *B65B 9/067* | (2012.01) | |
| *B29C 65/22* | (2006.01) | |
| *B65D 85/62* | (2006.01) | |
| *B65D 85/672* | (2006.01) | |
| *B65B 53/06* | (2006.01) | |

(52) U.S. Cl.
CPC .......... *B65B 25/146* (2013.01); *B65B 51/303* (2013.01); *B65D 71/08* (2013.01); *B65D 75/002* (2013.01); *B65D 85/62* (2013.01); *B65D 85/672* (2013.01); *B29C 66/71* (2013.01); *B65B 53/063* (2013.01)

(56) References Cited

U.S. PATENT DOCUMENTS

| | | |
|---|---|---|
| 3,026,231 A | 3/1962 | Chavannes |
| 3,049,469 A | 8/1962 | Davison |
| 3,058,873 A | 10/1962 | Keim et al. |
| 3,066,066 A | 11/1962 | Keim et al. |
| 3,097,994 A | 7/1963 | Dickens et al. |
| 3,125,552 A | 3/1964 | Loshaek et al. |
| 3,143,150 A | 8/1964 | Buchanan |
| 3,186,900 A | 6/1965 | De Young |
| 3,197,427 A | 7/1965 | Schmatz |
| 3,224,986 A | 12/1965 | Butler et al. |
| 3,224,990 A | 12/1965 | Babcock |
| 3,227,615 A | 1/1966 | Korden |
| 3,227,671 A | 1/1966 | Keim |
| 3,239,491 A | 3/1966 | Tsou et al. |
| 3,240,664 A | 3/1966 | Earle, Jr. |
| 3,240,761 A | 3/1966 | Keim et al. |
| 3,248,280 A | 4/1966 | Hyland, Jr. |
| 3,250,664 A | 5/1966 | Conte et al. |
| 3,252,181 A | 5/1966 | Hureau |
| 3,301,746 A | 1/1967 | Sanford et al. |
| 3,311,594 A | 3/1967 | Earle, Jr. |
| 3,329,657 A | 7/1967 | Strazdins et al. |
| 3,332,834 A | 7/1967 | Reynolds, Jr. |
| 3,332,901 A | 7/1967 | Keim |
| 3,352,833 A | 11/1967 | Earle, Jr. |
| 3,381,817 A | 5/1968 | Harm |
| 3,384,692 A | 5/1968 | Galt et al. |
| 3,414,459 A | 12/1968 | Wells |
| 3,442,754 A | 5/1969 | Espy |
| 3,459,697 A | 8/1969 | Goldberg et al. |
| 3,473,576 A | 10/1969 | Amneus |
| 3,483,077 A | 12/1969 | Aldrich |
| 3,545,165 A | 12/1970 | Greenwell |
| 3,556,932 A | 1/1971 | Coscia et al. |
| 3,573,164 A | 3/1971 | Friedberg et al. |
| 3,587,201 A | 6/1971 | Strayer |
| 3,609,126 A | 9/1971 | Asao et al. |
| 3,666,609 A | 5/1972 | Kalwaites et al. |
| 3,672,949 A | 6/1972 | Brown |
| 3,672,950 A | 6/1972 | Murphy et al. |
| 3,773,290 A | 11/1973 | Mowery |
| 3,778,339 A | 12/1973 | Williams et al. |
| 3,813,362 A | 5/1974 | Coscia et al. |
| 3,855,158 A | 12/1974 | Petrovich et al. |
| 3,877,510 A | 4/1975 | Tegtmeier et al. |
| 3,905,863 A | 9/1975 | Ayers |
| 3,911,173 A | 10/1975 | Sprague, Jr. |
| 3,974,025 A | 8/1976 | Ayers |
| 3,994,771 A | 11/1976 | Morgan, Jr. et al. |
| 3,998,690 A | 12/1976 | Lyness et al. |
| 4,038,008 A | 7/1977 | Larsen |
| 4,075,382 A | 2/1978 | Chapman et al. |
| 4,088,528 A | 5/1978 | Berger et al. |
| 4,098,632 A | 7/1978 | Sprague, Jr. |
| 4,102,737 A | 7/1978 | Morton |
| 4,129,528 A | 12/1978 | Petrovich et al. |
| 4,147,586 A | 4/1979 | Petrovich et al. |
| 4,184,519 A | 1/1980 | McDonald et al. |
| 4,190,692 A | 2/1980 | Larsen |
| 4,191,609 A | 3/1980 | Trokhan |
| 4,252,761 A | 2/1981 | Schoggen et al. |
| 4,320,162 A | 3/1982 | Schulz |
| 4,331,510 A | 5/1982 | Wells |
| 4,382,987 A | 5/1983 | Smart |
| 4,440,597 A | 4/1984 | Wells et al. |
| 4,501,862 A | 2/1985 | Keim |
| 4,507,351 A | 3/1985 | Johnson et al. |
| 4,514,345 A | 4/1985 | Johnson et al. |
| 4,515,657 A | 5/1985 | Maslanka |
| 4,528,239 A | 7/1985 | Trokhan |
| 4,529,480 A | 7/1985 | Trokhan |
| 4,535,587 A | 8/1985 | Rias |
| 4,537,657 A | 8/1985 | Keim |
| 4,545,857 A | 10/1985 | Wells |
| 4,595,093 A | 6/1986 | Eckstein |
| 4,637,859 A | 1/1987 | Trokhan |
| 4,678,590 A | 7/1987 | Nakamura et al. |
| 4,714,736 A | 12/1987 | Juhl et al. |
| 4,770,920 A | 9/1988 | Larsonneur |
| 4,780,357 A | 10/1988 | Akao |
| 4,808,467 A | 2/1989 | Suskind et al. |
| 1,836,894 A | 6/1989 | Chance et al. |
| 4,849,054 A | 7/1989 | Klowak |
| 4,885,202 A | 12/1989 | Lloyd et al. |
| 4,886,167 A | 12/1989 | Dearwester |
| 4,891,249 A | 1/1990 | McIntyre |
| 4,909,284 A | 3/1990 | Kositake |
| 4,949,668 A | 8/1990 | Heindel et al. |
| 4,949,688 A | 8/1990 | Bayless |
| 4,971,197 A | 11/1990 | Worley |
| 4,983,256 A | 1/1991 | Combette et al. |
| 4,996,091 A | 2/1991 | McIntyre |
| 5,027,582 A | 7/1991 | Dearwester |
| 5,059,282 A | 10/1991 | Ampulski et al. |
| 5,143,776 A | 9/1992 | Givens |
| 5,149,401 A | 9/1992 | Langevin et al. |
| 5,152,874 A | 10/1992 | Keller |
| 5,211,813 A | 5/1993 | Sawley et al. |
| 5,239,047 A | 8/1993 | Devore et al. |
| 5,279,098 A | 1/1994 | Fukuda |
| 5,281,306 A | 1/1994 | Kakiuchi et al. |
| 5,334,289 A | 8/1994 | Trokhan et al. |
| 5,347,795 A | 9/1994 | Fukuda |
| 5,397,435 A | 3/1995 | Ostendorf et al. |
| 5,399,412 A | 3/1995 | Sudall et al. |
| 5,405,501 A | 4/1995 | Phan et al. |
| 5,409,572 A | 4/1995 | Kershaw et al. |
| 5,429,686 A | 7/1995 | Chiu et al. |
| 5,439,559 A | 8/1995 | Crouse |
| 5,447,012 A | 9/1995 | Kovacs et al. |
| 5,470,436 A | 11/1995 | Wagle et al. |
| 5,487,313 A | 1/1996 | Johnson |
| 5,509,913 A | 4/1996 | Yeo |
| 5,510,002 A | 4/1996 | Hermans et al. |
| 5,529,665 A | 6/1996 | Kaun |
| 5,551,563 A | 9/1996 | Allen |
| 5,581,906 A | 12/1996 | Ensign et al. |
| 5,591,147 A | 1/1997 | Couture-Dorschner et al. |
| 5,607,551 A | 3/1997 | Farrington, Jr. et al. |
| 5,611,890 A | 3/1997 | Vinson et al. |
| 5,628,876 A | 5/1997 | Ayers et al. |
| 5,635,028 A | 6/1997 | Vinson et al. |
| 5,649,916 A | 7/1997 | DiPalma et al. |
| 5,671,897 A | 9/1997 | Ogg et al. |
| 5,672,248 A | 9/1997 | Wendt et al. |
| 5,679,222 A | 10/1997 | Rasch et al. |

(56) References Cited

U.S. PATENT DOCUMENTS

| | | |
|---|---|---|
| 5,685,428 A | 11/1997 | Herbers et al. |
| 5,728,268 A | 3/1998 | Weisman et al. |
| 5,746,887 A | 5/1998 | Wendt et al. |
| 5,753,067 A | 5/1998 | Fukuda et al. |
| 5,772,845 A | 6/1998 | Farrington, Jr. et al. |
| 5,806,569 A | 9/1998 | Gulya et al. |
| 5,827,384 A | 10/1998 | Canfield et al. |
| 5,832,962 A | 11/1998 | Kaufman et al. |
| 5,846,380 A | 12/1998 | Van Phan et al. |
| 5,855,738 A | 1/1999 | Weisman et al. |
| 5,858,554 A | 1/1999 | Neal et al. |
| 5,865,396 A | 2/1999 | Ogg et al. |
| 5,865,950 A | 2/1999 | Vinson et al. |
| 5,893,965 A | 4/1999 | Trokhan et al. |
| 5,913,765 A | 6/1999 | Burgess et al. |
| 5,934,470 A | 8/1999 | Bauer et al. |
| 5,942,085 A | 8/1999 | Neal et al. |
| 5,944,954 A | 8/1999 | Vinson et al. |
| 5,948,210 A | 9/1999 | Huston |
| 5,980,691 A | 11/1999 | Weisman et al. |
| 6,036,139 A | 3/2000 | Ogg |
| 6,039,838 A | 3/2000 | Kaufman et al. |
| 6,048,938 A | 4/2000 | Neal et al. |
| 6,060,149 A | 5/2000 | Nissing et al. |
| 6,106,670 A | 8/2000 | Weisman et al. |
| 6,149,769 A | 11/2000 | Mohammadi et al. |
| 6,162,327 A | 12/2000 | Batra et al. |
| 6,162,329 A | 12/2000 | Vinson et al. |
| 6,187,138 B1 | 2/2001 | Neal et al. |
| 6,200,419 B1 | 3/2001 | Phan |
| 6,203,667 B1 | 3/2001 | Huhtelin |
| 6,207,734 B1 | 3/2001 | Vinson et al. |
| 6,231,723 B1 | 5/2001 | Kanitz et al. |
| 6,287,426 B1 | 9/2001 | Edwards et al. |
| 6,303,233 B1 | 10/2001 | Amon et al. |
| 6,319,362 B1 | 11/2001 | Huhtelin et al. |
| 6,344,111 B1 | 2/2002 | Wilhelm |
| 6,420,013 B1 | 7/2002 | Vinson et al. |
| 6,420,100 B1 | 7/2002 | Trokhan et al. |
| 6,423,184 B2 | 7/2002 | Vahatalo et al. |
| 6,458,246 B1 | 10/2002 | Kanitz et al. |
| 6,464,831 B1 | 10/2002 | Trokhan et al. |
| 6,473,670 B1 | 10/2002 | Huhtelin |
| 6,521,089 B1 | 2/2003 | Griech et al. |
| 6,537,407 B1 | 3/2003 | Law et al. |
| 6,547,928 B2 | 4/2003 | Barnholtz et al. |
| 6,551,453 B2 | 4/2003 | Weisman et al. |
| 6,551,691 B1 | 4/2003 | Hoeft et al. |
| 6,572,722 B1 | 6/2003 | Pratt |
| 6,579,416 B1 | 6/2003 | Vinson et al. |
| 6,602,454 B2 | 8/2003 | McGuire et al. |
| 6,607,637 B1 | 8/2003 | Vinson et al. |
| 6,610,173 B1 | 8/2003 | Lindsay et al. |
| 6,613,194 B2 | 9/2003 | Kanitz et al. |
| 6,660,362 B1 | 9/2003 | Lindsay et al. |
| 6,673,202 B2 | 1/2004 | Burazin |
| 6,701,637 B2 | 5/2004 | Lindsay et al. |
| 6,755,939 B2 | 6/2004 | Vinson et al. |
| 6,773,647 B2 | 8/2004 | McGuire et al. |
| 6,797,117 B1 | 9/2004 | McKay et al. |
| 6,808,599 B2 | 10/2004 | Burazin |
| 6,821,386 B2 | 11/2004 | Weisman et al. |
| 6,821,391 B2 | 11/2004 | Scherb et al. |
| 6,827,818 B2 | 12/2004 | Farrington, Jr. et al. |
| 6,863,777 B2 | 3/2005 | Kanitz et al. |
| 6,896,767 B2 | 5/2005 | Wilhelm |
| 6,939,443 B2 | 9/2005 | Ryan et al. |
| 6,998,017 B2 | 2/2006 | Lindsay et al. |
| 6,998,024 B2 | 2/2006 | Burazin |
| 7,005,043 B2 | 2/2006 | Toney et al. |
| 7,014,735 B2 | 3/2006 | Kramer et al. |
| 7,105,465 B2 | 9/2006 | Patel et al. |
| 7,155,876 B2 | 1/2007 | Vandertuin et al. |
| 7,157,389 B2 | 1/2007 | Branham et al. |
| 7,182,837 B2 | 2/2007 | Chen et al. |
| 7,194,788 B2 | 3/2007 | Clark et al. |
| 7,235,156 B2 | 6/2007 | Baggot |
| 7,269,929 B2 | 9/2007 | Vandertuin et al. |
| 7,294,230 B2 | 11/2007 | Flugge-Berendes et al. |
| 7,311,853 B2 | 12/2007 | Vinson et al. |
| 7,328,550 B2 | 2/2008 | Schoeneck |
| 7,339,378 B2 | 3/2008 | Han et al. |
| 7,351,307 B2 | 4/2008 | Scherb et al. |
| 7,387,706 B2 | 6/2008 | Herman et al. |
| 7,399,378 B2 | 7/2008 | Edwards et al. |
| 7,419,569 B2 | 9/2008 | Hermans |
| 7,427,434 B2 | 9/2008 | Busam |
| 7,431,801 B2 | 10/2008 | Conn et al. |
| 7,432,309 B2 | 10/2008 | Vinson |
| 7,442,278 B2 | 10/2008 | Murray et al. |
| 7,452,447 B2 | 11/2008 | Duan et al. |
| 7,476,293 B2 | 1/2009 | Herman et al. |
| 7,494,563 B2 | 2/2009 | Edwards et al. |
| 7,510,631 B2 | 3/2009 | Scherb et al. |
| 7,513,975 B2 | 4/2009 | Burma |
| 7,563,344 B2 | 7/2009 | Beuther |
| 7,582,187 B2 | 9/2009 | Scherb et al. |
| 7,611,607 B2 | 11/2009 | Mullally et al. |
| 7,622,020 B2 | 11/2009 | Awofeso |
| 7,662,462 B2 | 2/2010 | Noda |
| 7,670,678 B2 | 3/2010 | Phan |
| 7,683,126 B2 | 3/2010 | Neal et al. |
| 7,686,923 B2 | 3/2010 | Scherb et al. |
| 7,687,140 B2 | 3/2010 | Manifold et al. |
| 7,691,230 B2 | 4/2010 | Scherb et al. |
| 7,744,722 B1 | 6/2010 | Tucker et al. |
| 7,744,726 B2 | 6/2010 | Scherb et al. |
| 7,799,382 B2 | 9/2010 | Payne et al. |
| 7,811,418 B2 | 10/2010 | Klerelid et al. |
| 7,815,978 B2 | 10/2010 | Davenport et al. |
| 7,823,366 B2 | 11/2010 | Schoeneck |
| 7,842,163 B2 | 11/2010 | Nickel et al. |
| 7,867,361 B2 | 1/2011 | Salaam et al. |
| 7,871,692 B2 | 1/2011 | Morin et al. |
| 7,887,673 B2 | 2/2011 | Andersson et al. |
| 7,905,989 B2 | 3/2011 | Scherb et al. |
| 7,914,866 B2 | 3/2011 | Shannon et al. |
| D636,273 S | 4/2011 | Ver Kuilen |
| 7,931,781 B2 | 4/2011 | Scherb et al. |
| 7,951,269 B2 | 5/2011 | Herman et al. |
| 7,955,549 B2 | 6/2011 | Noda |
| 7,959,764 B2 | 6/2011 | Ringer et al. |
| 7,972,475 B2 | 7/2011 | Chan et al. |
| 7,989,058 B2 | 8/2011 | Manifold et al. |
| 8,034,463 B2 | 10/2011 | Leimbach et al. |
| 8,051,629 B2 | 11/2011 | Pazdernik et al. |
| 8,075,739 B2 | 12/2011 | Scherb et al. |
| 8,092,652 B2 | 1/2012 | Scherb et al. |
| 8,118,979 B2 | 2/2012 | Herman et al. |
| 8,147,649 B1 | 4/2012 | Tucker et al. |
| 8,152,959 B2 | 4/2012 | Elony et al. |
| 8,196,314 B2 | 6/2012 | Munch |
| 8,216,427 B2 | 7/2012 | Klerelid et al. |
| 8,236,135 B2 | 8/2012 | Prodoehl et al. |
| 8,303,773 B2 | 11/2012 | Scherb et al. |
| 8,382,956 B2 | 2/2013 | Boechat et al. |
| 8,402,673 B2 | 3/2013 | Da Silva et al. |
| 8,409,404 B2 | 4/2013 | Harper et al. |
| 8,435,384 B2 | 5/2013 | Da Silva et al. |
| 8,440,055 B2 | 5/2013 | Scherb et al. |
| 8,445,032 B2 | 5/2013 | Topolkaraev et al. |
| 8,454,800 B2 | 6/2013 | Mourad et al. |
| 8,470,133 B2 | 6/2013 | Cunnane et al. |
| 8,506,756 B2 | 8/2013 | Denis et al. |
| 8,544,184 B2 | 10/2013 | Da Silva et al. |
| 8,574,211 B2 | 11/2013 | Morita |
| 8,580,083 B2 | 11/2013 | Boechat et al. |
| 8,728,277 B2 | 5/2014 | Boechat et al. |
| 8,758,569 B2 | 6/2014 | Aberg et al. |
| 8,771,466 B2 | 7/2014 | Denis et al. |
| 8,801,903 B2 | 8/2014 | Mourad et al. |
| 8,815,057 B2 | 8/2014 | Eberhardt et al. |
| 8,822,009 B2 | 9/2014 | Riviere et al. |
| 8,968,517 B2 | 3/2015 | Ramaratnam et al. |

(56) References Cited

U.S. PATENT DOCUMENTS

| | | |
|---|---|---|
| 8,980,062 B2 | 3/2015 | Karlsson et al. |
| 9,005,710 B2 | 4/2015 | Jones et al. |
| D734,617 S | 7/2015 | Seitzinger et al. |
| 9,095,477 B2 | 8/2015 | Yamaguchi |
| D738,633 S | 9/2015 | Seitzinger et al. |
| 9,382,666 B2 | 7/2016 | Ramaratnam et al. |
| 9,506,203 B2 | 11/2016 | Ramaratnam et al. |
| 9,580,872 B2 | 2/2017 | Ramaratnam et al. |
| 9,702,089 B2 | 7/2017 | Ramaratnam et al. |
| 9,702,090 B2 | 7/2017 | Ramaratnam et al. |
| 9,719,213 B2 | 8/2017 | Miller, IV et al. |
| 9,725,853 B2 | 8/2017 | Ramaratnam et al. |
| 2001/0018068 A1 | 8/2001 | Lorenzi et al. |
| 2002/0028230 A1 | 3/2002 | Eichhorn et al. |
| 2002/0060049 A1 | 5/2002 | Kanitz et al. |
| 2002/0061386 A1 | 5/2002 | Carson et al. |
| 2002/0098317 A1 | 7/2002 | Jaschinski et al. |
| 2002/0110655 A1 | 8/2002 | Seth |
| 2002/0115194 A1 | 8/2002 | Lange et al. |
| 2002/0125606 A1 | 9/2002 | McGuire et al. |
| 2003/0024674 A1 | 2/2003 | Kanitz et al. |
| 2003/0056911 A1 | 3/2003 | Hermans et al. |
| 2003/0056917 A1 | 3/2003 | Jimenez |
| 2003/0070781 A1 | 4/2003 | Hermans et al. |
| 2003/0114071 A1 | 6/2003 | Everhart et al. |
| 2003/0159401 A1 | 8/2003 | Sorenson et al. |
| 2003/0188843 A1 | 10/2003 | Kanitz et al. |
| 2003/0218274 A1 | 11/2003 | Boutilier et al. |
| 2003/0230051 A1 | 12/2003 | Tinti |
| 2004/0118531 A1 | 6/2004 | Shannon et al. |
| 2004/0123963 A1 | 7/2004 | Chen et al. |
| 2004/0126601 A1 | 7/2004 | Kramer et al. |
| 2004/0126710 A1 | 7/2004 | Hill et al. |
| 2004/0168784 A1 | 9/2004 | Duan et al. |
| 2004/0173333 A1 | 9/2004 | Hermans et al. |
| 2004/0200752 A1 | 10/2004 | Poli |
| 2004/0234804 A1 | 11/2004 | Liu et al. |
| 2005/0016704 A1 | 1/2005 | Huhtelin |
| 2005/0069679 A1 | 3/2005 | Stelljes et al. |
| 2005/0069680 A1 | 3/2005 | Stelljes et al. |
| 2005/0098281 A1 | 5/2005 | Schulz et al. |
| 2005/0112115 A1 | 5/2005 | Khan |
| 2005/0123726 A1 | 6/2005 | Broering et al. |
| 2005/0130536 A1 | 6/2005 | Siebers et al. |
| 2005/0136222 A1 | 6/2005 | Hada et al. |
| 2005/0148257 A1 | 7/2005 | Hermans et al. |
| 2005/0150626 A1 | 7/2005 | Kanitz et al. |
| 2005/0166551 A1 | 8/2005 | Keane et al. |
| 2005/0241786 A1 | 11/2005 | Edwards et al. |
| 2005/0241788 A1 | 11/2005 | Baggot et al. |
| 2005/0252626 A1 | 11/2005 | Chen et al. |
| 2005/0280184 A1 | 12/2005 | Sayers et al. |
| 2005/0287340 A1 | 12/2005 | Morelli et al. |
| 2006/0005916 A1 | 1/2006 | Stelljes et al. |
| 2006/0013998 A1 | 1/2006 | Stelljes, et al. |
| 2006/0019567 A1 | 1/2006 | Sayers |
| 2006/0083899 A1 | 4/2006 | Burazin et al. |
| 2006/0093788 A1 | 5/2006 | Behm et al. |
| 2006/0113049 A1 | 6/2006 | Knobloch et al. |
| 2006/0130986 A1 | 6/2006 | Flugge-Berendes et al. |
| 2006/0194022 A1 | 8/2006 | Boutilier et al. |
| 2006/0269706 A1 | 11/2006 | Shannon et al. |
| 2007/0020315 A1 | 1/2007 | Shannon et al. |
| 2007/0131366 A1 | 6/2007 | Underhill et al. |
| 2007/0137813 A1 | 6/2007 | Nickel et al. |
| 2007/0137814 A1 | 6/2007 | Gao |
| 2007/0170610 A1 | 7/2007 | Payne et al. |
| 2007/0240842 A1 | 10/2007 | Scherb et al. |
| 2007/0251659 A1 | 11/2007 | Fernandes et al. |
| 2007/0251660 A1 | 11/2007 | Walkenhaus et al. |
| 2007/0267157 A1 | 11/2007 | Kanitz et al. |
| 2007/0272381 A1 | 11/2007 | Elony et al. |
| 2007/0275866 A1 | 11/2007 | Dykstra |
| 2007/0298221 A1 | 12/2007 | Vinson |
| 2008/0035289 A1 | 2/2008 | Edwards et al. |
| 2008/0076695 A1 | 3/2008 | Uitenbroek et al. |
| 2008/0156450 A1 | 7/2008 | Klerelid et al. |
| 2008/0199655 A1 | 8/2008 | Monnerie et al. |
| 2008/0245498 A1 | 10/2008 | Ostendorf et al. |
| 2008/0302493 A1 | 12/2008 | Boatman et al. |
| 2008/0308247 A1 | 12/2008 | Ringer et al. |
| 2009/0020248 A1 | 1/2009 | Sumnicht et al. |
| 2009/0056892 A1 | 3/2009 | Rekoske |
| 2009/0061709 A1 | 3/2009 | Nakai et al. |
| 2009/0205797 A1 | 8/2009 | Fernandes et al. |
| 2009/0218058 A1 | 9/2009 | Manifold et al. |
| 2010/0065234 A1 | 3/2010 | Klerelid et al. |
| 2010/0119779 A1 | 5/2010 | Ostendorf et al. |
| 2010/0224338 A1 | 9/2010 | Harper et al. |
| 2010/0230064 A1 | 9/2010 | Eagles et al. |
| 2010/0236034 A1 | 9/2010 | Eagles et al. |
| 2010/0239825 A1 | 9/2010 | Sheehan et al. |
| 2010/0272965 A1 | 10/2010 | Schinkoreit et al. |
| 2011/0027545 A1 | 2/2011 | Harlacher et al. |
| 2011/0180223 A1 | 7/2011 | Klerelid et al. |
| 2011/0189435 A1 | 8/2011 | Manifold et al. |
| 2011/0189442 A1 | 8/2011 | Manifold et al. |
| 2011/0206913 A1 | 8/2011 | Manifold et al. |
| 2011/0223381 A1 | 9/2011 | Sauter et al. |
| 2011/0253329 A1 | 10/2011 | Manifold et al. |
| 2011/0265967 A1 | 11/2011 | Van Phan |
| 2011/0303379 A1 | 12/2011 | Boechat et al. |
| 2012/0144611 A1 | 6/2012 | Baker et al. |
| 2012/0152475 A1 | 6/2012 | Edwards et al. |
| 2012/0177888 A1 | 7/2012 | Escafere et al. |
| 2012/0244241 A1 | 9/2012 | McNeil |
| 2012/0267063 A1 | 10/2012 | Klerelid et al. |
| 2012/0297560 A1 | 11/2012 | Zwick et al. |
| 2013/0008135 A1 | 1/2013 | Moore et al. |
| 2013/0029105 A1 | 1/2013 | Miller et al. |
| 2013/0029106 A1 | 1/2013 | Lee et al. |
| 2013/0133851 A1 | 5/2013 | Boechat et al. |
| 2013/0150817 A1 | 6/2013 | Kainth et al. |
| 2013/0160960 A1 | 6/2013 | Hermans et al. |
| 2013/0209749 A1 | 8/2013 | Myangiro et al. |
| 2013/0248129 A1 | 9/2013 | Manifold et al. |
| 2013/0327487 A1 | 12/2013 | Espinosa et al. |
| 2014/0004307 A1 | 1/2014 | Sheehan |
| 2014/0041820 A1 | 2/2014 | Ramaratnam et al. |
| 2014/0041822 A1 | 2/2014 | Boechat et al. |
| 2014/0050890 A1 | 2/2014 | Zwick et al. |
| 2014/0053994 A1 | 2/2014 | Manifold et al. |
| 2014/0096924 A1 | 4/2014 | Rekokske et al. |
| 2014/0182798 A1 | 7/2014 | Polat et al. |
| 2014/0242320 A1 | 8/2014 | McNeil et al. |
| 2014/0272269 A1 | 9/2014 | Hansen |
| 2014/0272747 A1 | 9/2014 | Ciurkot |
| 2014/0284237 A1 | 9/2014 | Gosset |
| 2014/0360519 A1 | 12/2014 | George et al. |
| 2015/0859995 | 3/2015 | Ramaratnam et al. |
| 2015/0102526 A1 | 4/2015 | Ward et al. |
| 2015/0129145 A1 | 5/2015 | Chou et al. |
| 2015/0211179 A1 | 7/2015 | Alias et al. |
| 2015/0241788 A1 | 8/2015 | Yamaguchi |
| 2015/0330029 A1 | 11/2015 | Ramaratnam et al. |
| 2016/0060811 A1 | 3/2016 | Riding et al. |
| 2016/0090692 A1 | 3/2016 | Eagles et al. |
| 2016/0090693 A1 | 3/2016 | Eagles et al. |
| 2016/0130762 A1 | 5/2016 | Ramaratnam et al. |
| 2016/0137398 A1 | 5/2016 | Lemke et al. |
| 2016/0145818 A1 | 5/2016 | Miller, IV et al. |
| 2016/0159807 A1 | 6/2016 | Miller, IV et al. |
| 2016/0160448 A1 | 6/2016 | Miller, IV et al. |
| 2016/0185041 A1 | 6/2016 | Topolkaraev et al. |
| 2016/0185050 A1 | 6/2016 | Topolkaraev et al. |
| 2016/0273168 A1 | 9/2016 | Ramaratnam et al. |
| 2016/0273169 A1 | 9/2016 | Ramaratnam et al. |
| 2016/0289897 A1 | 10/2016 | Ramaratnam et al. |
| 2016/0289898 A1 | 10/2016 | Ramaratnam et al. |
| 2017/0044717 A1 | 2/2017 | Quigley |
| 2017/0101741 A1 | 4/2017 | Sealey et al. |
| 2017/0167082 A1 | 6/2017 | Ramaratnam et al. |

(56) References Cited

U.S. PATENT DOCUMENTS

2017/0226698 A1    8/2017  LeBrun et al.
2017/0233946 A1    8/2017  Sealey et al.
2017/0268178 A1    9/2017  Ramaratnam et al.

FOREIGN PATENT DOCUMENTS

| | | |
|---|---|---|
| CN | 1138356 A | 12/1996 |
| CN | 1207149 A | 2/1999 |
| CN | 1244899 A | 2/2000 |
| CN | 1268559 A | 10/2000 |
| CN | 1377405 A | 10/2002 |
| CN | 2728254 Y | 9/2005 |
| DE | 4242539 A1 | 8/1993 |
| EP | 0097036 A2 | 12/1983 |
| EP | 0979895 A1 | 2/2000 |
| EP | 1911574 A1 | 1/2007 |
| EP | 1339915 B1 | 7/2007 |
| EP | 2123826 A2 | 5/2009 |
| GB | 946093 A | 1/1964 |
| JP | 2013208298 A | 10/2013 |
| JP | 2014213138 A | 11/2014 |
| WO | 96/06223 A1 | 2/1996 |
| WO | 200382550 A2 | 10/2003 |
| WO | 200445834 A1 | 6/2004 |
| WO | 2007070145 A1 | 6/2007 |
| WO | 2008019702 A1 | 2/2008 |
| WO | 2009006709 A1 | 1/2009 |
| WO | 2009/061079 A1 | 5/2009 |
| WO | 2009067079 A1 | 5/2009 |
| WO | 2011028823 A1 | 3/2011 |
| WO | 2012003360 A2 | 1/2012 |
| WO | 2013024297 A1 | 2/2013 |
| WO | 2013136471 A1 | 9/2013 |
| WO | 2014/022848 A1 | 2/2014 |
| WO | 201500755 A1 | 1/2015 |
| WO | 2015/176063 A1 | 11/2015 |
| WO | 2016/077594 A1 | 5/2016 |
| WO | 2016/086019 A1 | 6/2016 |
| WO | 2016/090242 A1 | 6/2016 |
| WO | 2016/090364 A1 | 6/2016 |
| WO | 2016085704 A1 | 6/2016 |
| WO | 2017066465 A1 | 4/2017 |
| WO | 2017066656 A1 | 4/2017 |
| WO | 2017139786 A1 | 8/2017 |

OTHER PUBLICATIONS

Supplementary European Search Report of EP 13 82 6461 dated Apr. 1, 2016.
Written Opinion of International Searching Authority for PCT/US15/62483 dated May 6, 2016.
International Search Report for PCT/US15/63986 dated Mar. 29, 2016.
Written Opinion of International Searching Authority for PCT/US15/63986 dated Mar. 29, 2016.
International Search Report for PCT/US15/64284 dated Feb. 11, 2016.
Written Opinion of International Searching Authority for PCT/US15/64284 dated Feb. 11, 2016.
International Search Report for PCT/US13/53593 dated Dec. 30, 2013.
Written Opinion of International Searching Authority for PCT/US13/53593 dated Dec. 30, 2013.
International Search Report for PCT/US15/31411 dated Aug. 13, 2015.
Written Opinion of International Searching Authority for PCT/US15/31411 dated Aug. 13, 2015.
International Search Report for PCT/US15/60398 dated Jan. 29, 2016.
Written Opinion of International Searching Authority for PCT/US15/60398 dated Jan. 29, 2016.
International Search Report for PCT/US15/62483 dated May 6, 2016.
International Search Report for PCT/US16/56871 dated Jan. 12, 2017.
Written Opinion of International Searching Authority for PCT/US16/56871 dated Jan. 12, 2017.
International Search Report for PCT/US17/17705 dated Jun. 9, 2017.
Written Opinion of International Searching Authority for PCT/US17/17705 dated Jun. 9, 2017.
International Search Report for PCT/US2017/029890 dated Jul. 14, 2017.
Written Opinion of International Searching Authority for PCT/US2017/029890 dated Jul. 14, 2017.
International Search Report for PCT/US2017/032746 dated Aug. 7, 2017.
Written Opinion of International Searching Authority for PCT/US2017/032746 dated Aug. 7, 2017.
International Search Report of PCT/US2016/057163 dated Dec. 23, 2016.
Written Opinion of PCT/US2016/057163 dated Dec. 23, 2016.

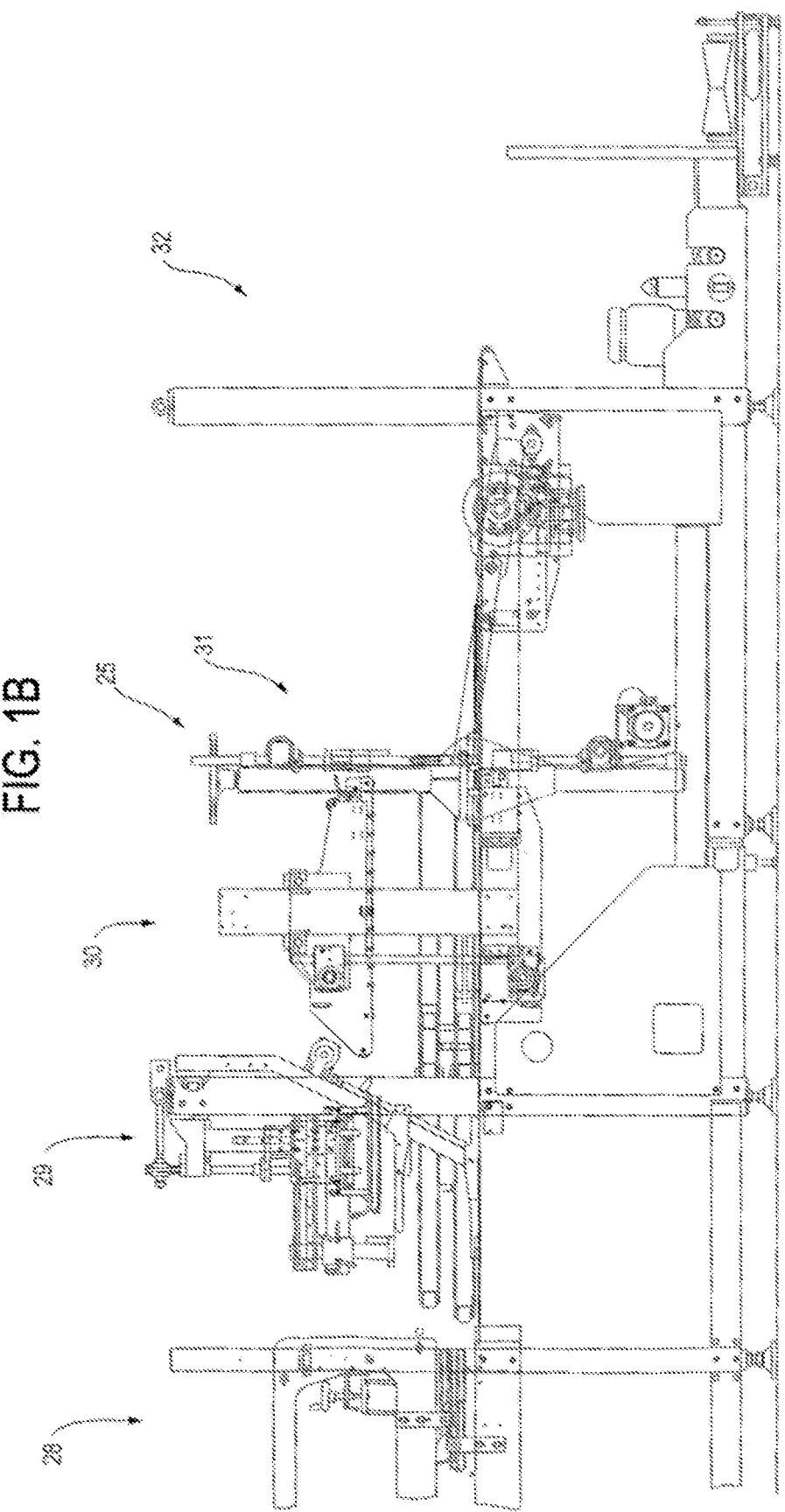

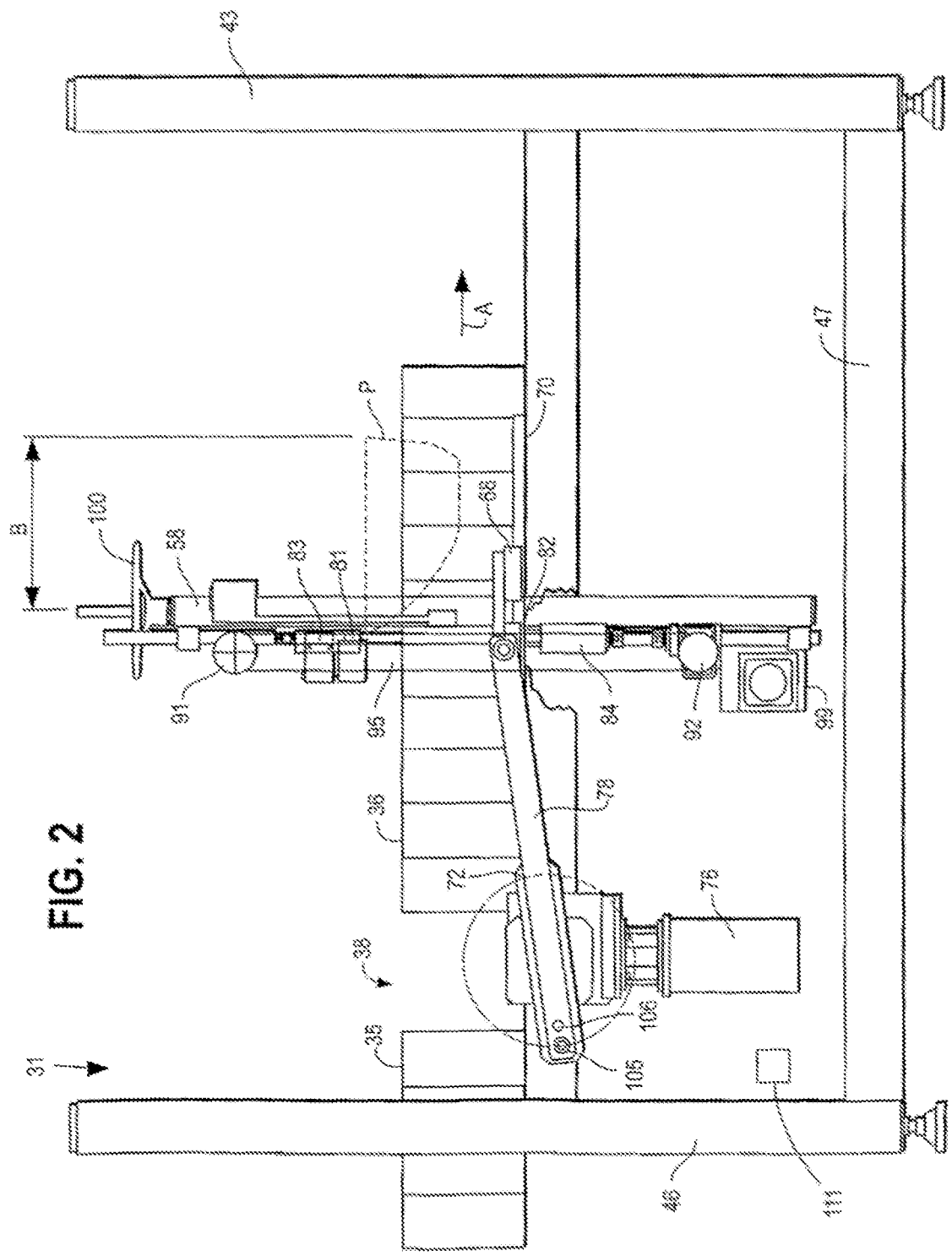

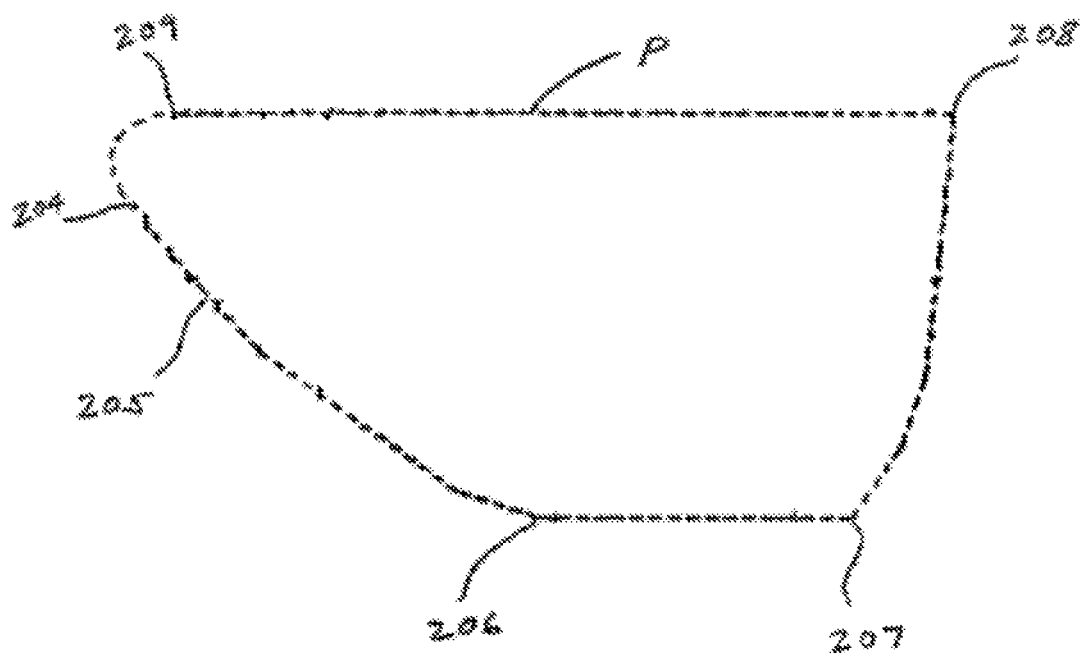

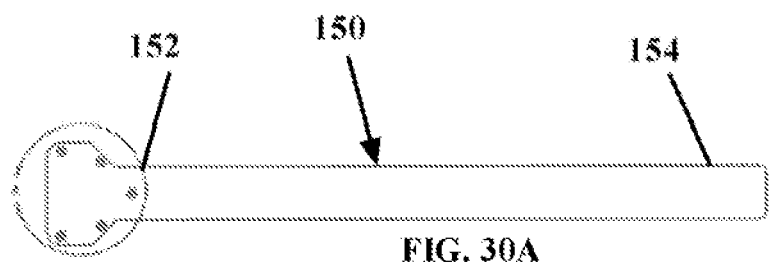
FIG. 30A
FIG. 30B
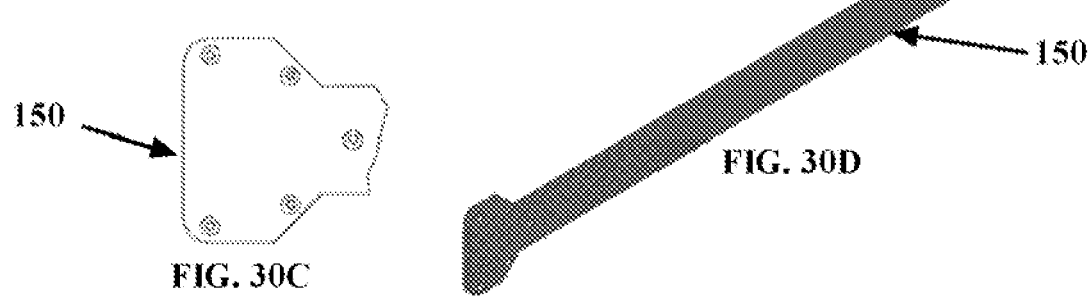
FIG. 30C
FIG. 30D

BUNDLED PRODUCT AND SYSTEM

RELATED APPLICATIONS

This application is a continuation of U.S. patent application Ser. No. 15/294,305, filed Oct. 14, 2016, entitled BUNDLED PRODUCT AND SYSTEM AND METHOD FOR FORMING THE SAME, which in turn claims priority to U.S. Provisional Patent Application No. 62/241,554, filed Oct. 14, 2015, entitled BUNDLED PRODUCT AND SYSTEM AND METHOD FOR FORMING THE SAME, and U.S. Provisional Patent Application No. 62/370,128, filed Aug. 2, 2016, entitled BUNDLED PRODUCT AND SYSTEM AND METHOD FOR FORMING THE SAME, and the contents of these applications are incorporated herein by reference in their entirety.

FIELD OF THE INVENTION

The present invention generally relates to packaging of items in a film, and in particular to systems and methods for packaging groups of items tightly within a film.

BACKGROUND

US Patent Application Publication No. 2003/0159401 refers to a sealing apparatus and, more particularly, to a sealing apparatus which is particularly suitable for a packaging machine in which spaced-apart products are enclosed by a plastic film.

U.S. Pat. No. 5,447,012 also discloses a sealing apparatus, and in particular describes a packaging machine for packaging bundles or groups of products such as rolls of bathroom tissue or paper towels. The rolls are advanced by a conveyor and pull belts, and groups of rolls are collated into bundles. The bundles are wrapped by a plastic film, and the longitudinal edges of the film are lapped and sealed to form an elongated tube.

The film is sealed between each pair of adjacent bundles by a sealing assembly. The sealing assembly simultaneously seals the trailing end of the exiting bundle and the leading edge of the incoming bundle.

U.S. Pat. No. 5,753,067 describes a sealer for a bag maker-packaging machine. Thermoplastic bag-making material is formed into a vertical tube, and the tube is sealed by a transverse sealer. The sealer includes a pair of seal jaws which are mounted on rotary arms which rotate on shafts. The shafts are moved toward and away from each other by a turn-buckle mechanism. The seal jaws thereby move along D-shaped trajectories.

U.S. Pat. Nos. 5,279,098 and 5,347,795 describe specific mechanisms for moving the shafts of the rotary arms toward and away from each other.

SUMMARY OF THE INVENTION

This invention relates to an improvement to conventional packaging apparatuses, such as the packaging apparatus described in US Patent Application Publication 2003/0159401, through installation of a background flat plate against which the packages are sealed in plastic film. With the installation of the flat plate, new levels of bundle "tightness" or minimized excess void volume inside the bundled package is obtained. Bundle tightness may be improved further through the use of a heat tunnel that shrinks the film around the packaged items.

According to exemplary embodiment of the present invention, a background flat plate is provided for a packaging machine which wraps spaced-apart products with a tubular film. The background flat plate allows the products to be bundled with less plastic or other material film resulting in a "tighter" package and less void volume for the product to move inside the film as compared to conventional packaging machines.

The packaging machine further includes a sealing apparatus. The sealing apparatus includes a frame which provides a path along which the products are advanced. A sealing support structure is mounted on the frame for linear reciprocating movement along the path. The longitudinal edges of the plastic film are overlapped and sealed by means of a heating element with pressurized air to provide an elongated tube of film. The background flat plate is provided between the pressurized air and the product to act as a background for the act of sealing the lapped film together. The flat plate applies pressure to the plastic film, thereby minimizing or eliminating the volume of space between the plastic film and product, which in turn maximizes bundle tightness. A crank arm is rotatably mounted on the frame for reciprocating the sealing support structure. Upper and lower sealing dies are mounted on the sealing support structure for linear movement toward and away from each other in a direction which is generally perpendicular to the path.

Upper and lower sealing dies are moved linearly in two directions while the products to be sealed move continuously to provide good speed with fewer moving components. The continuous motion allows the machine to be run at substantially slower speeds to accomplish the same rate of production as the intermittent motion of the conventional machines, thereby allowing reduced costs for the same output and improved product control. The design also allows higher production when the machine is kept running at full constant speeds, providing a substantially faster rate of production without increasing cost.

The sealing dies are mounted on mounting bars which are guided for linear vertical movement. The dies are moved toward each other to close against the film for sealing and are moved away from each other to allow the products to pass between the dies. The die mounting bars are mounted on a reciprocating frame which is reciprocated linearly in a direction parallel to the direction in which products move so that the sealing dies move with the film during the sealing step.

The sealing dies are opened and closed by a servo motor so that the length of the sealing region can be varied automatically. This offers a significant advantage when running packages of variable length. The ability to automatically vary the length of the sealing region offers higher rates of operation when running shorter packages and reduces the acceleration and deceleration rates required to return the dies to their initial cycle positions.

The opening gap between the upper and lower dies can also be varied automatically. This offers a significant advantage when running packages of variable height.

The opening and closing rates of the sealing dies can be varied without altering the placement of the dies relative to the product. This offers a significant advantage when extracting air from between the packages while closing the dies. Another advantage of this feature is that the sealing time can be maximized by quickly opening the dies without altering the horizontal placement of the dies relative to the product.

According to an exemplary embodiment of the present invention, a packing apparatus for packaging and sealing spaced-apart products comprises: a frame that provides a path along which spaced-apart products move; a sealing support structure mounted on the frame for movement along the path; a heating element with pressurized air that provides an elongated tube of film; a flat plate that provides a background for sealing the film; upper and lower sealing units mounted on the sealing support structure for movement toward and away from each other in a direction which is generally perpendicular to the path; means for moving the upper and lower sealing units toward each other to close the sealing units whereby the film between the sealing units are sealed and for moving the upper and lower sealing units away from each to open the sealing units; and means for reciprocating the sealing support along the path between first and second positions.

In an exemplary embodiment, the sealing support structure is mounted on the frame for linear reciprocating movement along the path.

In an exemplary embodiment, the upper and lower sealing units are mounted on the sealing support structure for linear movement toward and away from each other.

In an exemplary embodiment, the means for moving the upper and lower sealing units comprises a servo motor.

In an exemplary embodiment, the means for moving the upper and lower sealing units comprises a belt drive which is driven by the servo motor.

In an exemplary embodiment, the means for reciprocating the sealing support structure comprises a crank arm rotatably mounted on the frame and a link connecting the crank arm and the sealing support structure.

In an exemplary embodiment, the packing apparatus comprises a servo motor for rotating the crank arm.

In an exemplary embodiment, the packing apparatus comprises a linear bearing between the sealing support structure and the frame for supporting the sealing support structure for linear movement along the path.

In an exemplary embodiment, the packing apparatus comprises a linear guide on the sealing support structure, the upper and lower sealing units being mounted on the linear guide for linear movement toward and away from each other.

In an exemplary embodiment, the packing apparatus comprises a linear guide on the sealing support structure and linear bearings on the upper and lower sealing units for supporting the sealing units for linear movement along the path.

In an exemplary embodiment, the packing apparatus comprises a linear guide on the frame and a linear bearing on the sealing support structure for supporting the sealing support structure for linear movement along said path.

In an exemplary embodiment, the means for reciprocating the sealing support structure comprises a belt drive mounted on the frame and connected to the sealing support structure.

In an exemplary embodiment, the packing apparatus comprises a linear guide on the frame which extends in the direction of the path and a linear bearing on the sealing support structure for supporting the sealing support structure for linear movement along the path.

In an exemplary embodiment, the packing apparatus comprises a pair of linear guides on the sealing support structure which extend generally perpendicularly to the path, and a pair of bearings on each of the upper and lower sealing units slidably mounted on the linear guides for linear movement toward and away from each other.

In an exemplary embodiment, the packing apparatus comprises upper and lower cross members connected to the pair of linear guides, and means for moving the upper and lower cross members and the linear guides in a direction which is generally perpendicular to the path.

In an exemplary embodiment, the linear guides are slidably mounted in the sealing support structure.

In an exemplary embodiment, the means for moving comprises a threaded shaft connected to one of the upper and lower cross members and extending through the sealing support structure whereby rotation of the threaded shaft moves the upper and lower cross members and the linear guides relative to the sealing support structure.

In an exemplary embodiment, the packing apparatus comprises upper pulleys rotatably mounted on the upper cross member and lower pulleys rotatably mounted on the lower cross member, a pair of drive belts extending over the upper and lower pulleys, and means for rotating the upper or lower pulleys to move the drive belts, the upper and lower sealing units being connected to the drive belts for movement with the drive belts.

In an exemplary embodiment, the product is rolled tissue or towel product.

In an exemplary embodiment, the packaging apparatus produces bundles of product with height dimensions not exceeding the length of the total package.

In an exemplary embodiment, the bundles have a lap seal direction pinch deflection of less than 10 mm as measured by the bundle tightness testing procedure.

In an exemplary embodiment, the packing apparatus comprises a heat tunnel.

A shippable bundled product according to an exemplary embodiment of the present invention comprises: a plurality of paper product rolls each individually packaged by a first package material and arranged relative to one another so as to form a bundle, the bundle being packaged by a second package material, wherein the second package material has a shrinkage factor relative to the bundle of less than zero and the bundle has a size of 18 in.×14 in.×8 in.

In an exemplary embodiment, first and second package materials comprise high density and low density polyethylene.

In an exemplary embodiment, the second package material has a higher quantity of high density polyethylene as compared to the first package material.

In an exemplary embodiment, the second package material comprises one or more outer layers that are comprised of 10-100% polypropylene.

In an exemplary embodiment, at least one of the first and second package materials comprises laminated layers of polypropylene film.

In an exemplary embodiment, the first package material has a higher percentage of anti-block resin as compared to the second package material.

In an exemplary embodiment, the second package material comprises a number of layers within the range of 3 to 5.

In an exemplary embodiment, a center layer of the second package material comprises a higher percentage of high density polyethylene as compared to outer layers.

In an exemplary embodiment, the first package material has a higher quantity of anti-block resin on a side in contact with the second package material as compared to a side in contact with the individually packaged paper product roll.

In an exemplary embodiment, the second package material is subjected to heat treatment.

In an exemplary embodiment, the second package material has a lower crystallinity after the heat treatment.

In an exemplary embodiment, the second package material has a surface area that is lower after the heat treatment.

In an exemplary embodiment, wherein a temperature range of the heat treatment is between 300-400 degrees Fahrenheit.

In an exemplary embodiment, a duration of the heat treatment is between 20 to 45 seconds.

In an exemplary embodiment, a puncture resistance of the second package material is between 800-1200 gf.

In an exemplary embodiment, the second package material has a thickness between 1.0 to 3.5 thousands of an inch.

In an exemplary embodiment, the second package material exhibits anisotropic properties after heat treatment.

In an exemplary embodiment, the individually packaged paper product rolls are arranged relative to one another in a staggered/interlocking stacking pattern.

A shippable bundled product according to an exemplary embodiment of the present invention comprises: a plurality of paper product rolls each individually packaged by a first package material and arranged relative to one another so as to form a bundle, the paper product having a bulk greater than 400 microns, each paper product roll having a diameter less than 122 mm and a roll width equal to or greater than 4 inches, the bundle being packaged by a second package material, wherein the second package material has a shrinkage factor relative to the bundle of less than zero and the bundle has a size of 18 in.×14 in.×8 in.

In an exemplary embodiment, each of the plurality of paper product rolls has a roll density between 9.5 cc/g to 12 cc/g.

In an exemplary embodiment, each of the plurality of paper product rolls has a Kershaw Firmness of less than 4 mm.

A shippable bundled product according to an exemplary embodiment of the present invention comprises: a plurality of paper product rolls each individually packaged by a first package material and arranged relative to one another so as to form a bundle, the bundle being packaged by a second package material, wherein the second package material has a shrinkage factor relative to the bundle of less than zero and a melting point between 120 and 140 deg C, and the bundle has a size of 18 in.×14 in.×8 in.

A shippable bundled product according to an exemplary embodiment of the present invention comprises: a plurality of paper product rolls each individually packaged by a first package material and arranged relative to one another so as to form a bundle, the bundle being packaged by a second package material, wherein the second package material has a shrinkage factor relative to the bundle of less than zero

DESCRIPTION OF THE DRAWINGS

FIGS. 1A and 1B are fragmentary side elevational views of a packaging machine which includes a sealing apparatus in accordance with the invention;

FIG. 2 is an enlarged side elevation view of the sealing apparatus;

FIG. 29 illustrates one example of the movement of the upper sealing die.

FIGS. 30A-30D show various views of a background flat plate according to an exemplary embodiment of the present invention.

DETAILED DESCRIPTION

Figure 1A:
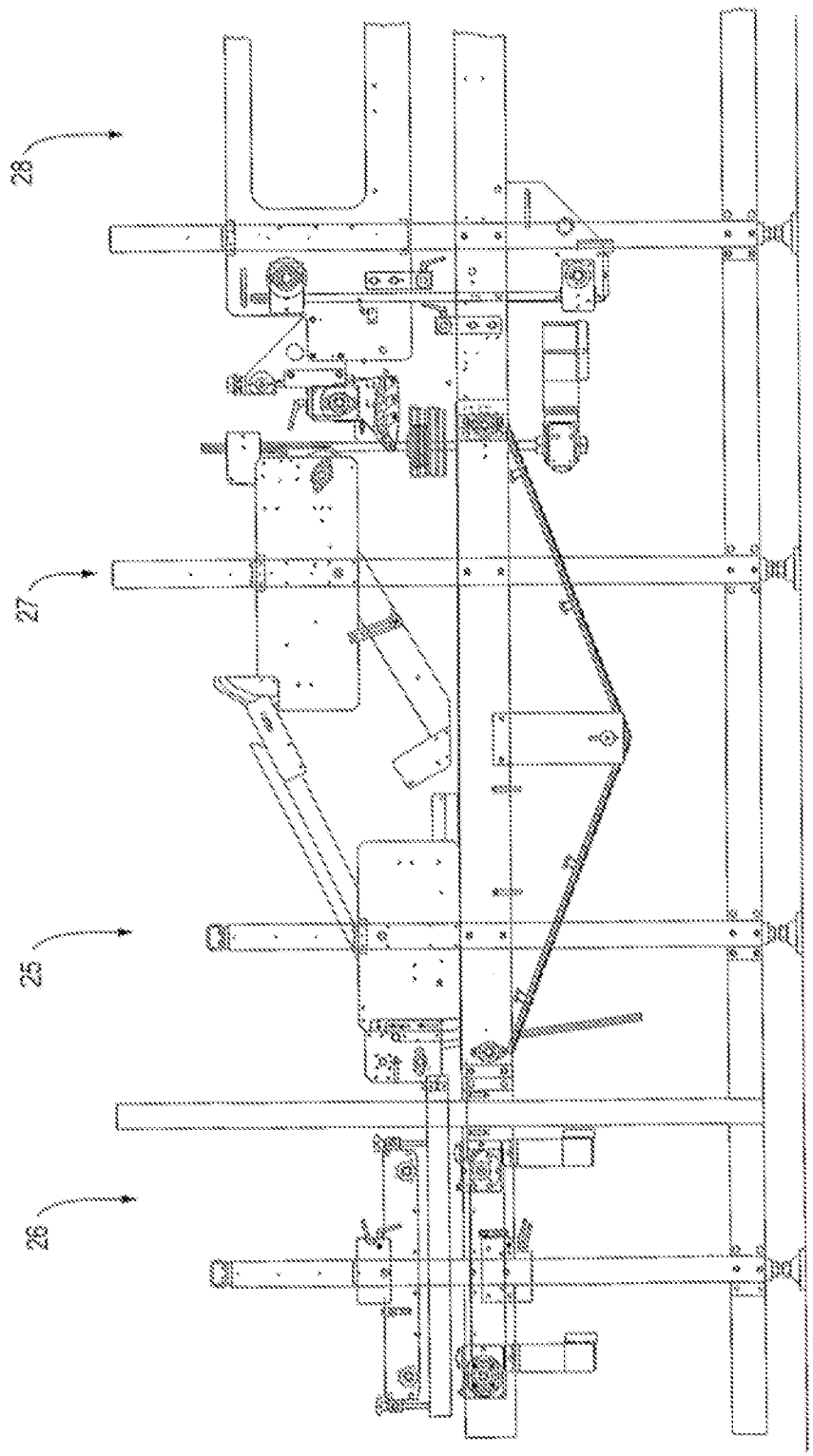

FIGS. 1A, 1B and 1C illustrate a packaging machine, generally designated by reference number 25, according to an exemplary embodiment of the present invention. The machine 25 is particularly suitable for packaging bundles of rolls of bathroom tissue or paper towels.

The machine 25 includes an infeed choke belt section 26, a product upender section 27, a product collator section 28, a film feed/lap seal/girth former section 29, a pull belt section 30, a sealing section 31, and a discharge section 32. Details of those sections, except for the collator section and the improvements in the sealing section, are described in U.S. Pat. No. 5,447,012 and U.S. Patent Application Publication 2003/0159401, the contents of which are incorporated herein by reference in their entirety.

Figure 3:
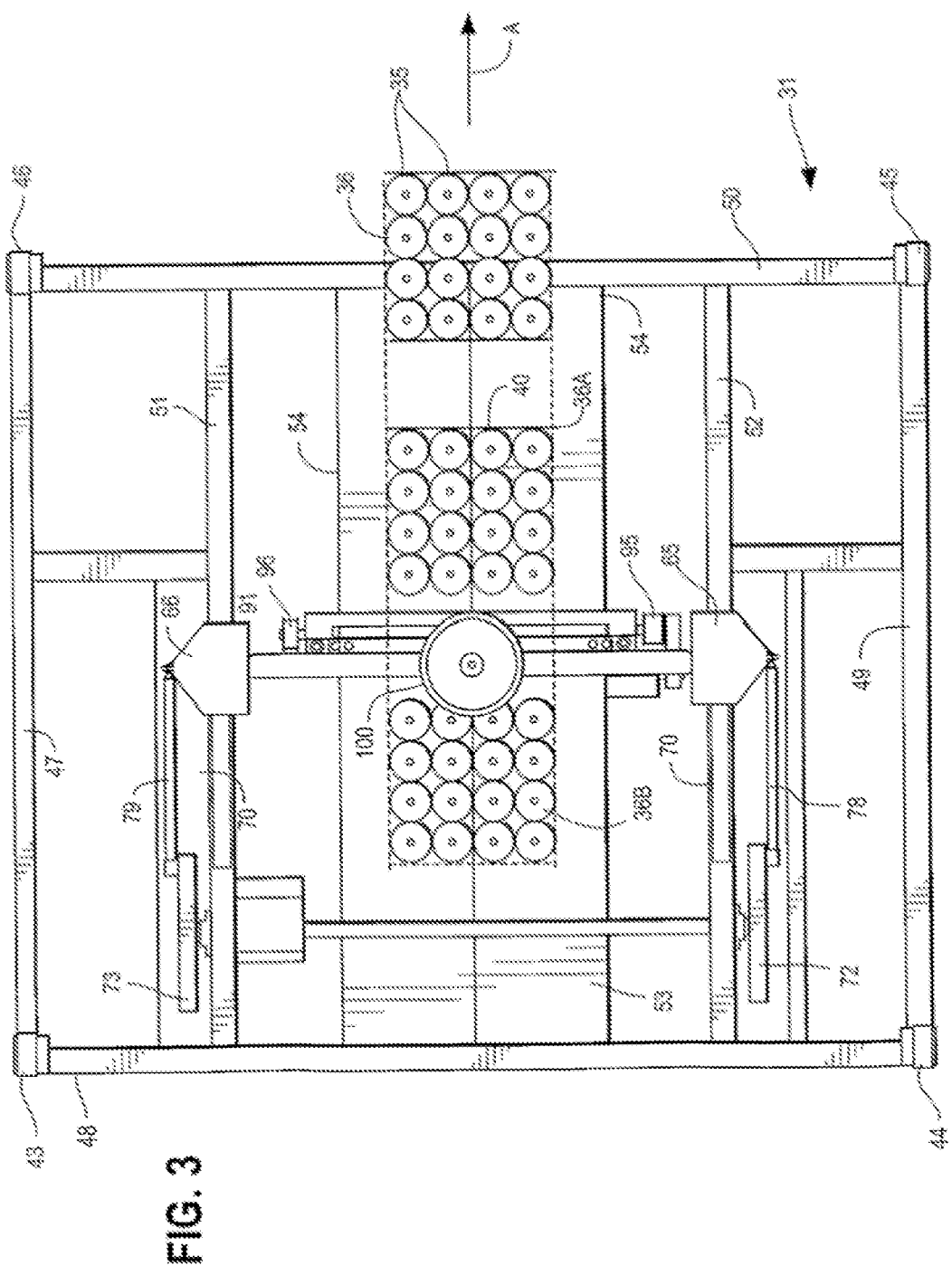
FIG. 3 is a top plan view of the sealing apparatus.
Figure 4:
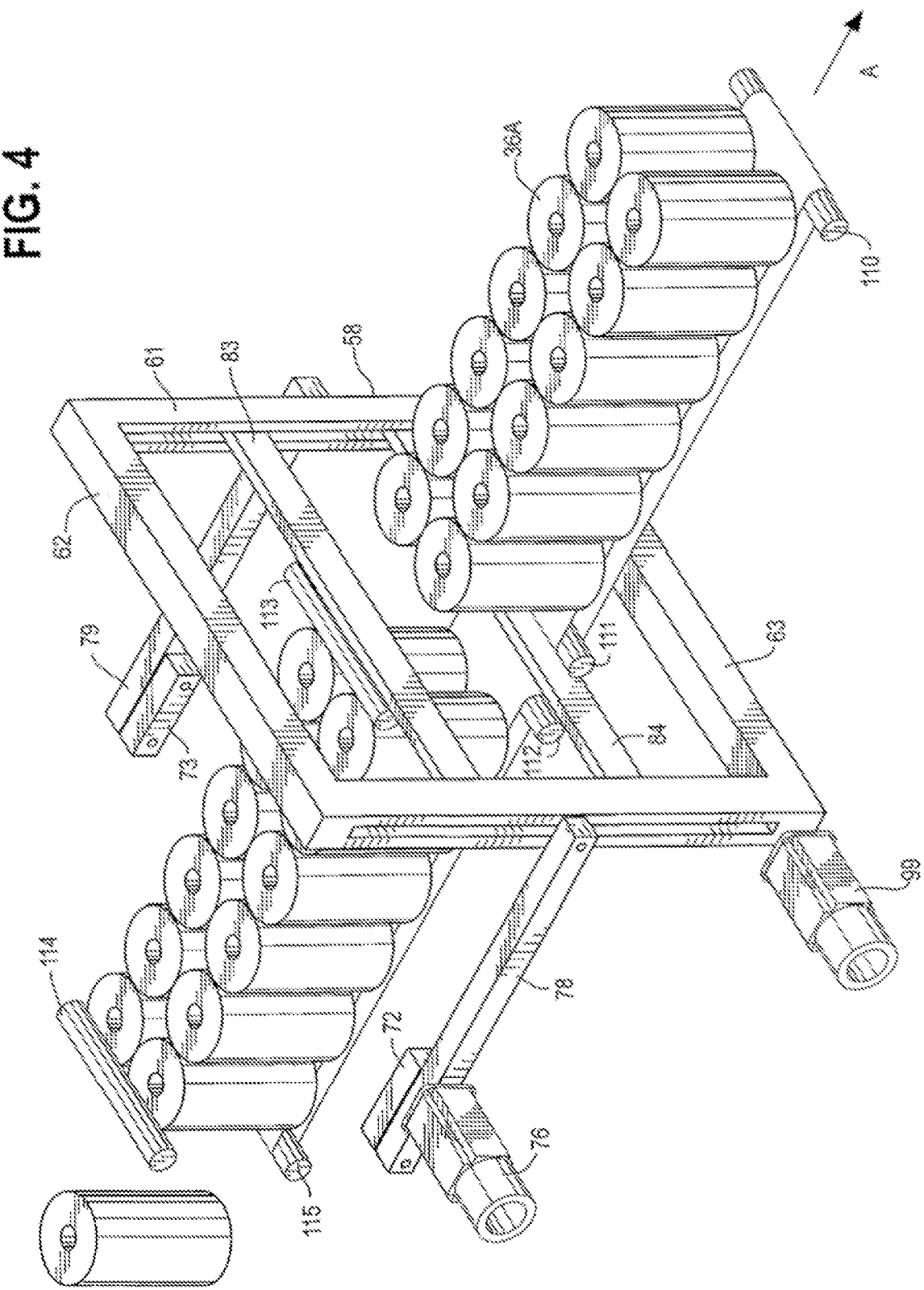
FIGS. 4-12 are perspective views which illustrate the sequence of steps in a sealing cycle.

Referring to FIGS. 2 and 3, the packaging machine 25 groups rolls 35 of bathroom tissue or paper towels into bundles 36. In FIG. 3, each bundle includes four rolls across the direction in which the rolls are advanced and four rolls in the machine direction. In FIG. 4 each bundle includes two rolls across and six rolls in the machine direction. Many other configurations are possible. Rolls can also be stacked on top of each other.

The bundles 36 are advanced in the direction of the arrow A in FIGS. 2-21 by conveyors and pull belts. Before reaching the sealing section 31, the bundles are enclosed by a plastic film 38 (FIGS. 2 and 3). As is well known in the art, the longitudinal edges of the plastic film are overlapped and sealed by means of a heating element with pressurized air to provide an elongated tube which extends in the direction of the arrow A. In between the pressurized air and the product stands a flat plate 150 to act as a background for the act of sealing the lapped plastic film together. As shown in FIG. 1C, the flat plate 150 is located within the former section 29 of the machine 25. The plate 150 reduces the distance between the top of the product and the plastic film 38 during the sealing process. This elimination of space allows for a tighter fit of the plastic film 38 around the product.

As shown in more detail in FIGS. 30A-30D, the plate 150 is a generally elongated element that includes a proximal end portion 152 and a distal end portion 154. The proximal end portion 152 is fixed to the machine 25 and the distal end portion 154 is left unattached and free floating. The plate 150 is made of a flexible material, such as, for example, aluminum or plastic, so that the distal end portion 154 of the plate 150 is able to exert force downwards onto the product in reaction to the product pushing the plate 150 upwards as the product passes underneath. The downward force of the plate 150 reduces or eliminates the space between the product and the plastic film 38.

As will be explained hereinafter, the sealing section 31 cuts and seals the plastic tube between each pair of bundles. In FIG. 3, the leading end 40 of the bundle 36A has already been sealed. The plastic tube between the handles 36A and 36B is about to be cut and sealed to provide a sealed trailing end for bundle 36A and a sealed leading end for bundle 36B.

Referring to FIGS. 2 and 3, the sealing section or apparatus 31 includes a stationary frame, generally designated by reference number 42, which includes vertical posts 43-46 and horizontal beams 47-52. Driven pull belts 53 and 54 (FIG. 3) for conveying the bundles is mounted on the horizontal beams.

Figure 24:
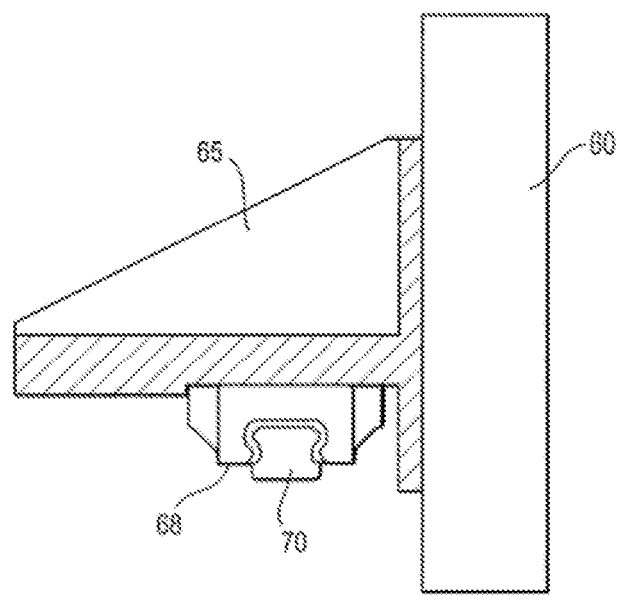
FIG. 24 is an enlarged fragmentary view of one of the linear guides and bearings.

A traversing or reciprocating frame, generally designated by reference number 58, is mounted on the stationary frame 42 for forward and backward linear reciprocating movement in directions which are parallel to the direction of the product movement. The reciprocating frame 58 includes a pair of vertical bars 60 and 61 (FIG. 4) and upper and lower cross bars 62 and 63. Laterally extending brackets 65 and 66 (FIG. 3) are attached to the vertical bars 60 and 61, and a channel shaped bearing 68 (FIGS. 2, 22, and 24) is mounted below each of the brackets. The bearings 68 ride on a linear guides or rails 70 which are mounted on the horizontal beams 51 and 52 of the stationary frame 42.

In the embodiment illustrated in FIGS. 2 and 3 the frame 58 is reciprocated by a pair of crank arms 72 and 73 which are fixedly mounted on a shaft 74 which is rotatably mounted on the stationary frame 42. The shaft 74 is rotated by a servo motor 76 on the stationary frame. The crank arms 72 and 73 are connected to the brackets 65 and 66 on the reciprocating frame 58 by links 78 and 79. The ends of the links are pivotally connected to the crank arms and the brackets.

FIG. 2 illustrates the reciprocating frame 58 in its most upstream or left position with respect to the direction A of product flow. As the shaft 74 rotates 180° from its FIG. 2 position, the crank arms 72 and 73 and the links 78 and 79 move the frame 58 linearly to the right in the direction of product flow. The linear movement of the frame is guided by the linear guides 70.

The stroke or length of movement of the reciprocating frame is indicated in FIG. 2 by dimension B. The most downstream position or right position of the frame corresponds to the right end of dimension B.

As the shaft 74 continues to rotate from 180° through 360°, the crank arms and links move the reciprocating frame opposite to the direction of product flow to return the frame to the FIG. 2 position.

Figure 23:
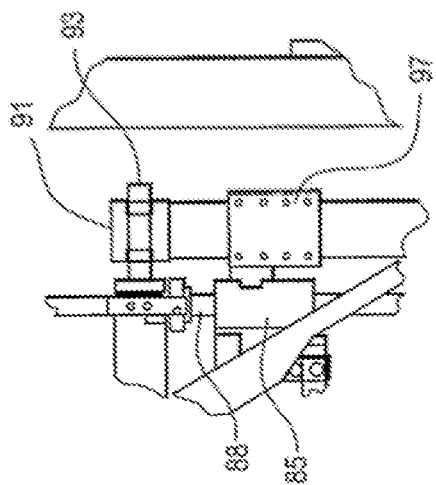
FIG. 23 is an enlarged fragmentary view of a portion of FIG. 22.
Figure 22:
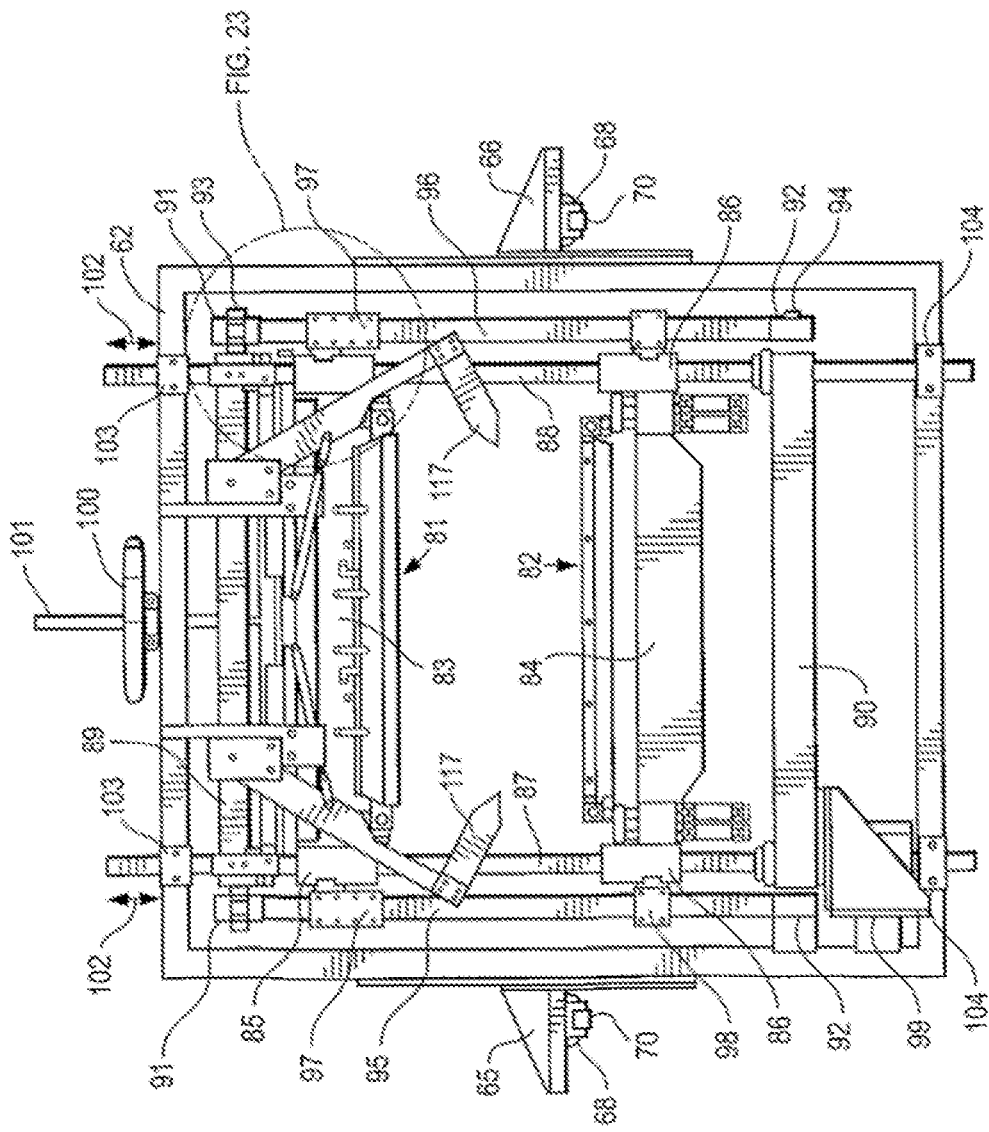
FIG. 22 is a transverse view of the sealing section.

Referring to FIGS. 22 and 23, upper and lower sealing die assemblies 81 and 82 are attached to mounting bars 83 and 84 which are attached to upper and lower linear bearings 85 and 86. The linear bearings 85 and 86 are vertically slidable on vertical shafts 87 and 88.

Upper and lower cross members 89 and 90 are clamped to the vertical shafts 87 and 88. Upper and lower pulleys 91 and 92 are mounted on cross shafts 93 and 94 which are attached to the cross members 89 and 90. Right and left drive belts 95 and 96 travel over the upper and lower pulleys 91 and 92.

The upper mounting bar 83 is connected to the rear portions of the drive belts 95 and 96 by clamps 97 (FIG. 23). The lower mounting bar 84 is connected to the front portions of the drive belts by clamps 98. The lower cross shaft 94 and the lower pulleys 92 are driven by a servo motor 99.

The mounting bars 83 and 84 for the sealing dies are mounted for vertical reciprocating movement on the vertical shafts 87 and 88. When the servo 99 rotates the lower pulleys 92 counterclockwise, the rear loops of the drive belts 95 and 96 move downward, carrying the upper die 81 downward, while the front loops of the belts 95 and 96 move upward, carrying the lower die 82 upward. The simultaneous movements close the dies. Rotating the servo clockwise then opens the dies.

Figure 25:
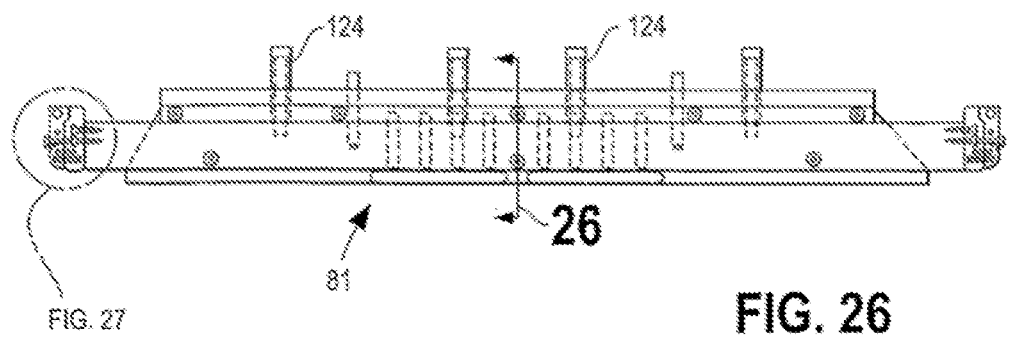
FIG. 25 is a front view of the upper die assembly.
Figure 27:
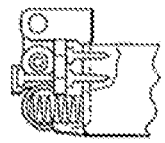
FIG. 27 is an enlarged fragmentary view of the right end of the upper die assembly.
Figure 26:
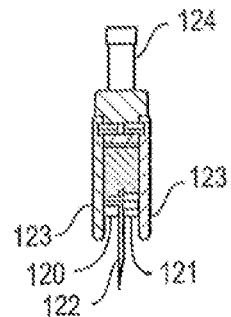
FIG. 26 is a sectional view taken along the line 26-26 of FIG. 25.

Referring to FIGS. 25 and 26, the upper die assembly 81 includes a pair of conventional impulse sealing ribbons 120 and 121 and a serrated cut-off knife 122 mounted between the sealing ribbons. The sealing ribbon 120 seals the trailing end of the exiting bundle, and the sealing ribbon 121 seals the leading end of the incoming bundle. A layer of Teflon® fabric insulates the ribbons and prevents molten plastic from adhering to the ribbons. A pair of film grippers 123 straddle the sealing ribbons and are resiliently biased by gripper springs 124. As the upper and lower dies close, the film grippers grip the film, the knife 122 cuts the film, and the sealing ribbons 120, 121 seal the film.

In one specific embodiment the servo motor 99 is a 71 in-lb (8 Nm) NC servo motor which includes a 20:1 planetary gear box.

The servo motor 99 adjusts the open dimension between dies to accommodate format height changes. The closed location of the dies is adjustable by a hand wheel (FIG. 22). The cross members 89 and 90 and the vertical shafts 87 and 88 form a vertically movable assembly which includes the pulleys 91 and 93, drive belts 95 and 96, and mounting bars 82 and 83. The hand wheel is threadedly connected to a threaded shaft 101. The threaded shaft passes through upper beam 62 and is rotatably connected to the cross member 89. When the hand wheel is rotated, the threaded shaft 101 moves the vertically movable assembly up or down as indicated by the arrows 102. The vertical shafts 87 and 88 slide within linear guides 103 and 104 on the upper and lower beams 62 and 63 to permit the up and down movement of the vertically movable assembly.

The hand wheel is used to raise or lower the sealing die assembly so that when the dies are closed, they are at half the height of the product to be sealed, or at the center of the package.

The threaded shaft can also be rotated by a servo motor or other mechanical or electrical driving means. Further, the vertically movable assembly could be raised or lowered by mechanisms other than a threaded shaft, for example, a belt drive.

The reciprocating die frame 58 reciprocates horizontally, propelled by the crank arms 72 and 73 to match the speed of the plastic film while severing and sealing the film tube. The crank arms 72 and 73 advantageously provide two pivot locations 105 and 106 (FIG. 2) for the crank arms 72 and 73 to change the amount of horizontal die movement. In one specific embodiment the two pivot locations provided 12 inches and 16 inches of horizontal die movement. The pivot location is set manually depending on the product format.

Figure 28:
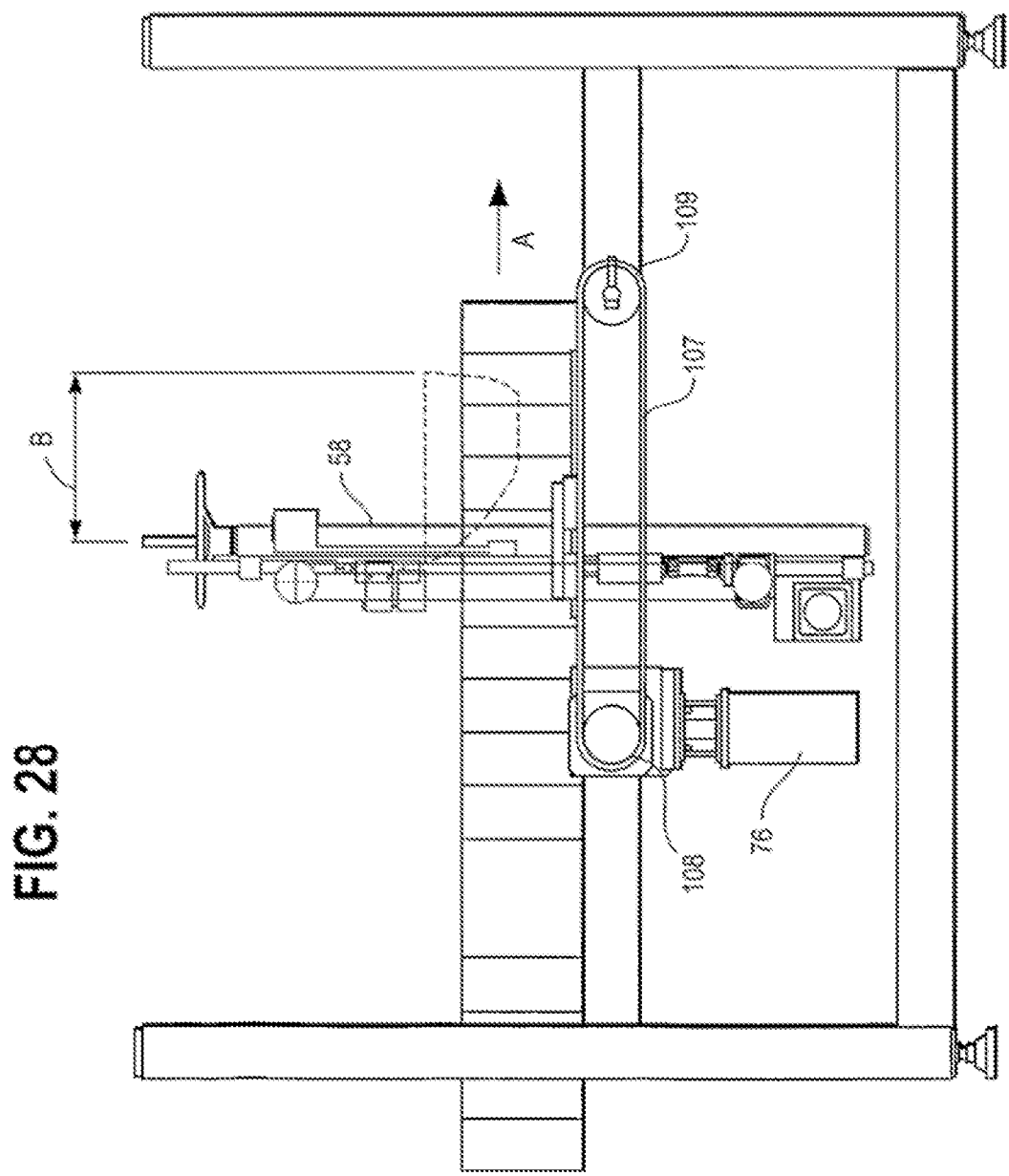
FIG. 28 is a view similar to FIG. 2 of a modified embodiment.

One alternative method of reciprocating the die frame 58 is illustrated in FIG. 28. The reciprocating die frame 58 is attached to a belt drive 107 which travels over pulleys 108 and 109. The pulley 108 is driven by servo motor 76. Rotation of the belt drive in one direction moves the reciprocating die frame to the right, and rotation of the belt drive in the opposite direction moves the die frame to the left.

In one specific embodiment the servo motor 76 for the crank mechanism is a 105 in-lb (12 Nm) NC servo motor driving the die crank mechanism through a 50:1 gear box. The servo motors and pull belts are controlled by a controller 111 (FIG. 2), such as a Giddings & Lewis MMC4PC with a remote 1/0.

Figure 13:
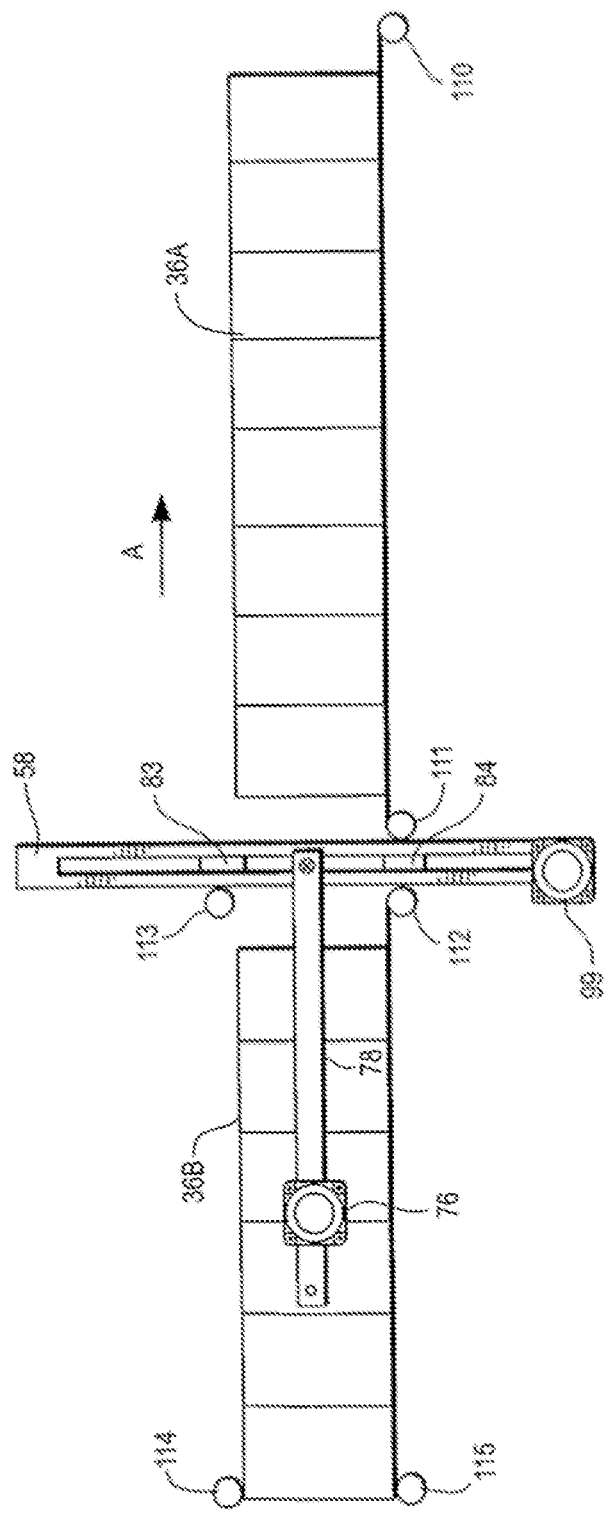
FIGS. 13-21 are side views which correspond to FIGS. 4-12.

FIGS. 4 and 13 illustrate the first step in the sealing cycle. The leading end of the exiting bundle 36A has already been sealed. The upper and lower die mounting bars 83 and 84 are in their open positions to allow the exiting bundle 36A to move past the sealing dies. As described in U.S. Pat. No. 5,447,012, the movement of the bundles is controlled by pull belts which are entrained over upper and lower rollers 110-115. Side pull belts may also be used. The crank arms 72 and 73 are positioned so that the reciprocating frame 58 is at the beginning of its forward movement in the direction A of product movement.

Figure 5:
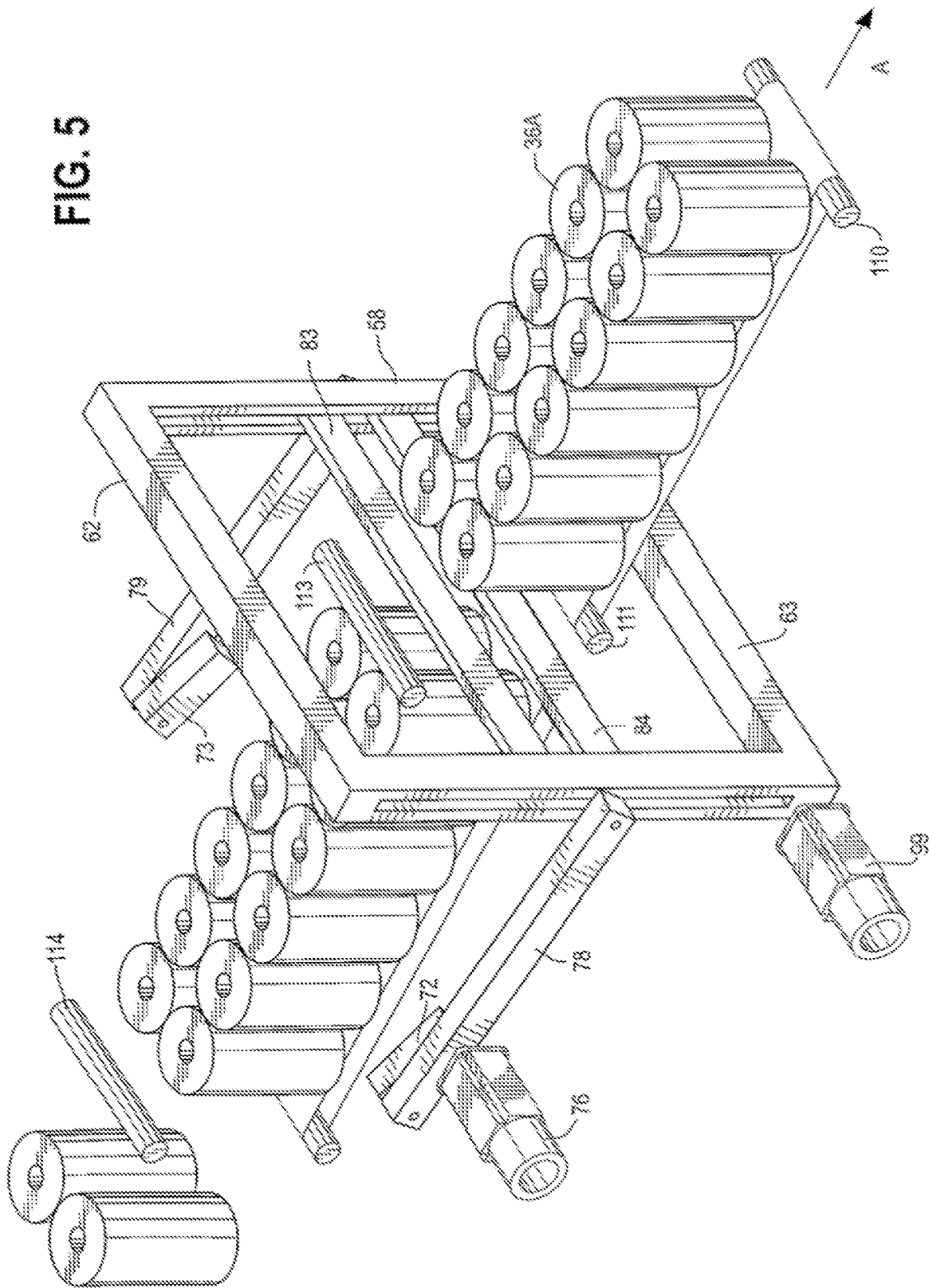
Figure 14:
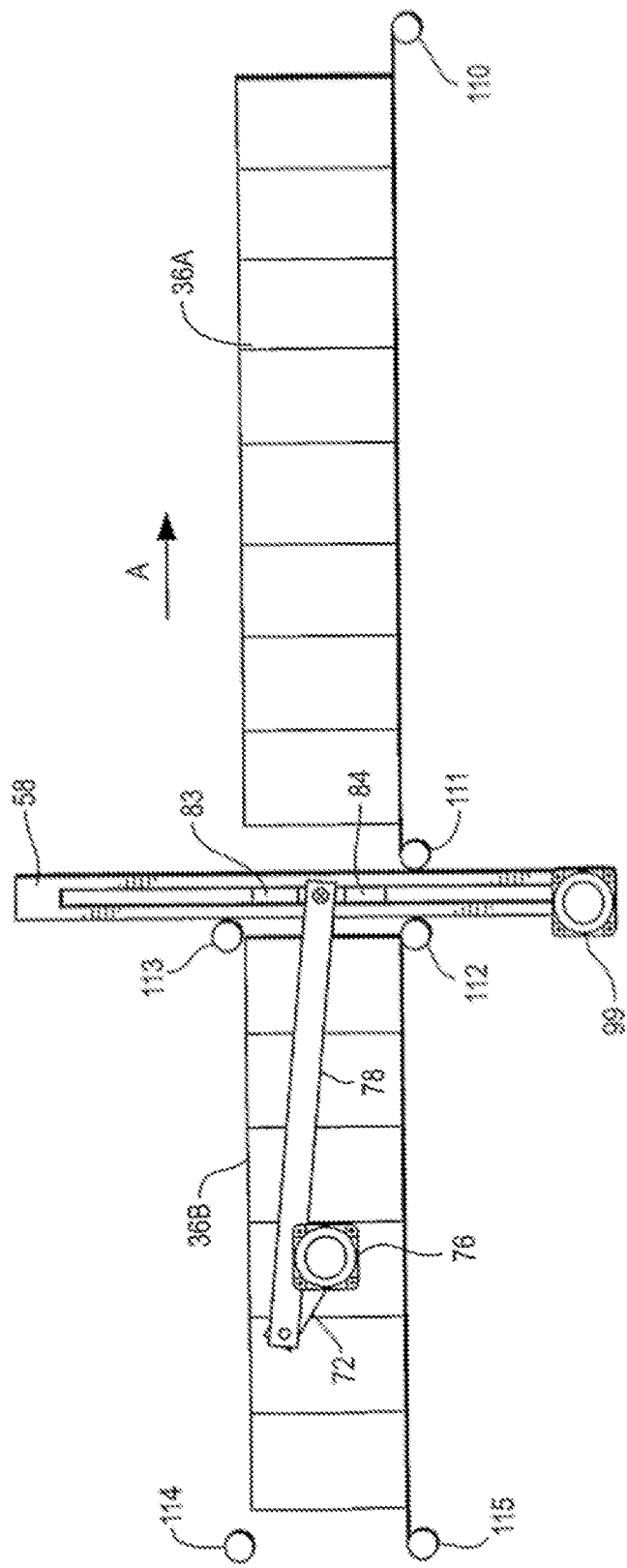

FIGS. 5 and 14 illustrate the sealing dies in the process of closing between bundles 36A and 36B. As the dies move toward each other, the reciprocating frame 58 is moved forwardly by the crank arms 72 and 73. The rate at which the dies are closed can be varied to allow the incoming bundle 36B to collapse the gap with the existing bundle 36A. The rate of die closing is coordinated with the rate of the die traverse for optimal sealing and end gussets. The discharge pull belt assemblies and side discharge pull belt assemblies can be separated in order to release the bundles contained therebetween so that the downward movement of the sealing dies against the plastic film tube can collapse the film tube and move adjacent bundles together. Alternatively, the discharge pull belts could be driven in reverse to accomplish the same results, or the bundle can be allowed to slide across the discharge pull belt on rollers 110 and 111 as the dies close.

As described in U.S. Pat. No. 5,447,012, gusset plates form gussets in the sides of the plastic tube as the tube is collapsed by the sealing dies.

Figure 6:
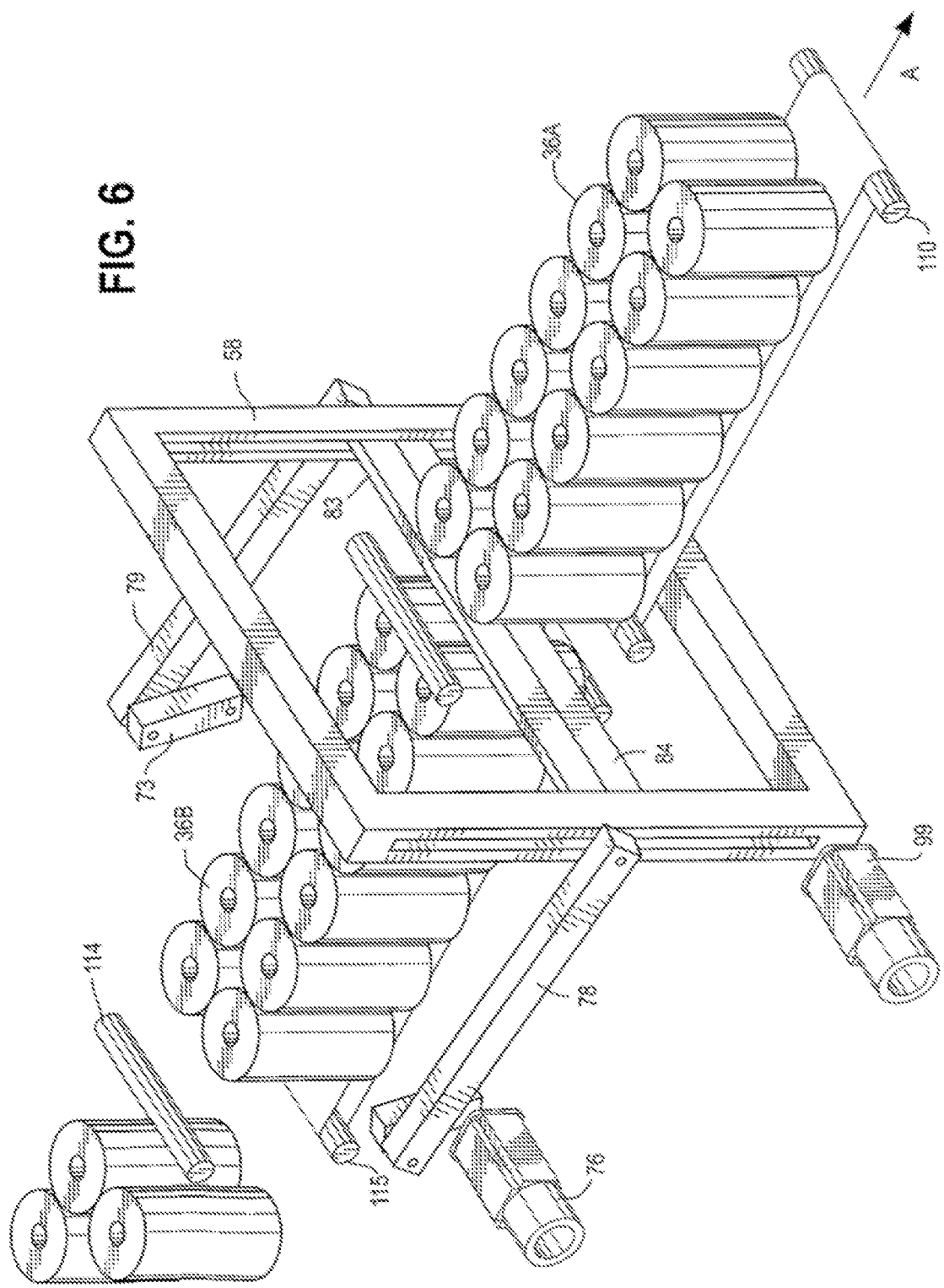
Figure 15:
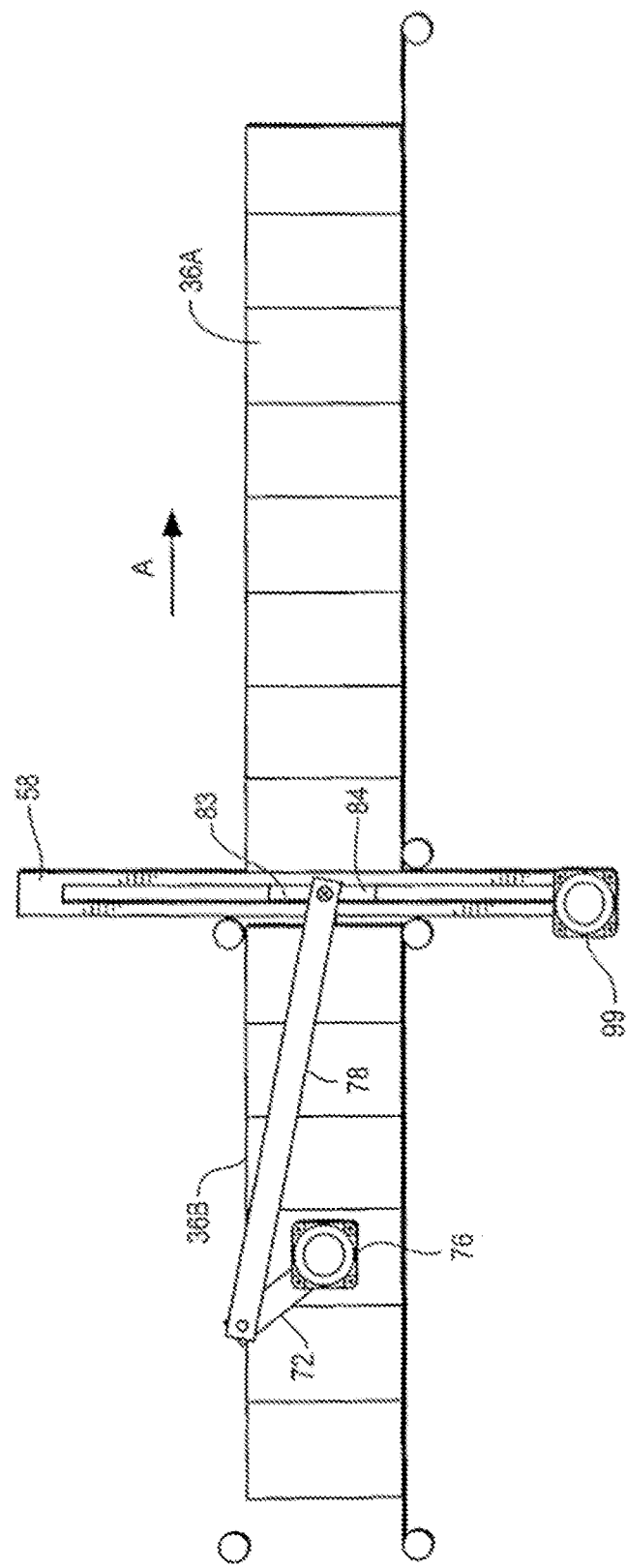

Mechanical tuckers 117 (FIG. 22) can be used to assist the forming of the gussets on large packages. FIGS. 6 and 15 illustrate the sealing dies in the closed position at the start of the sealing step. The plastic tube is clamped between the sealing dies so that the sealing ribbons can begin sealing the plastic. The cut-off knife severs the plastic between the spaced-apart sealing ribbons.

Figure 7:
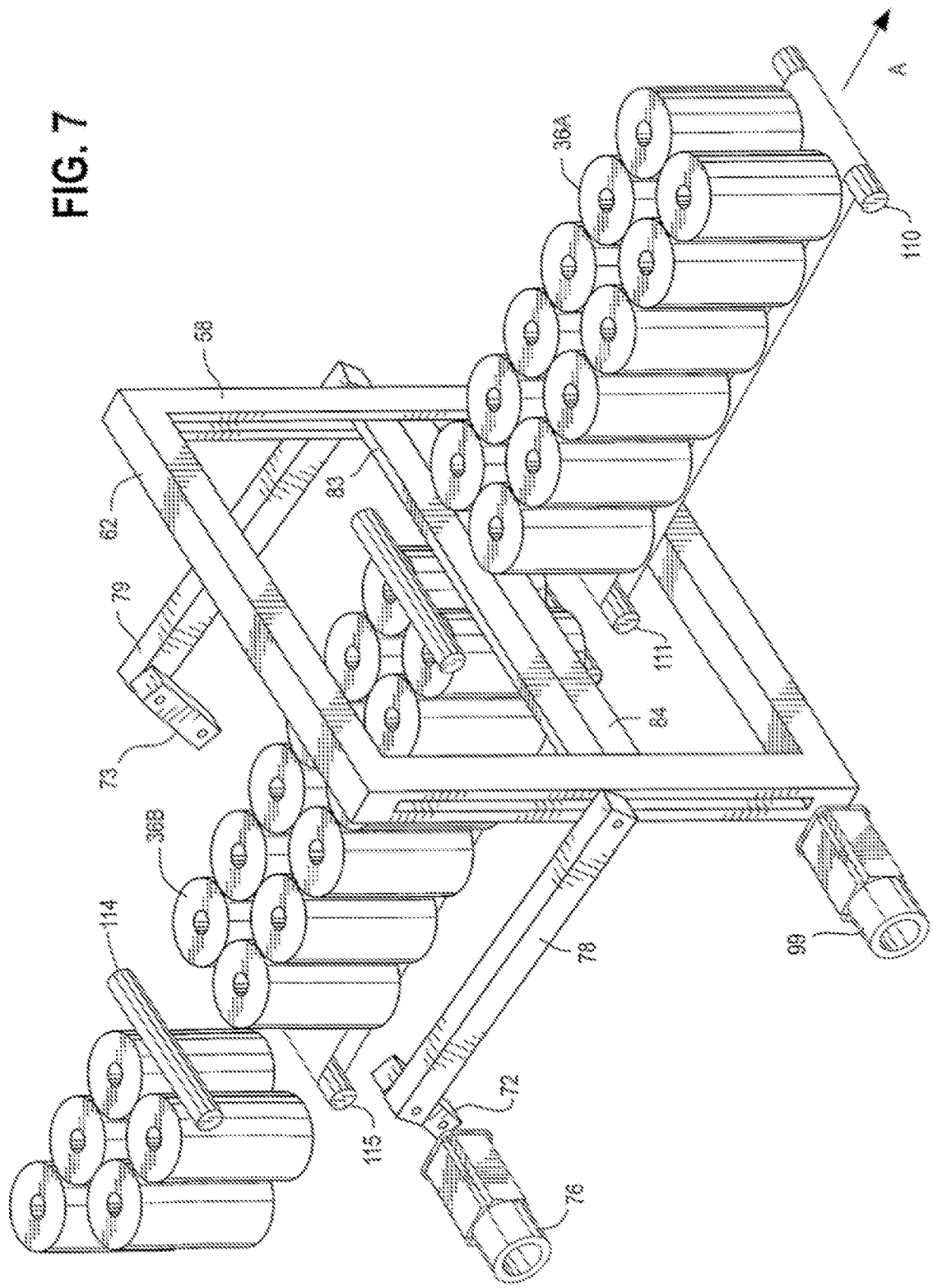
Figure 16:
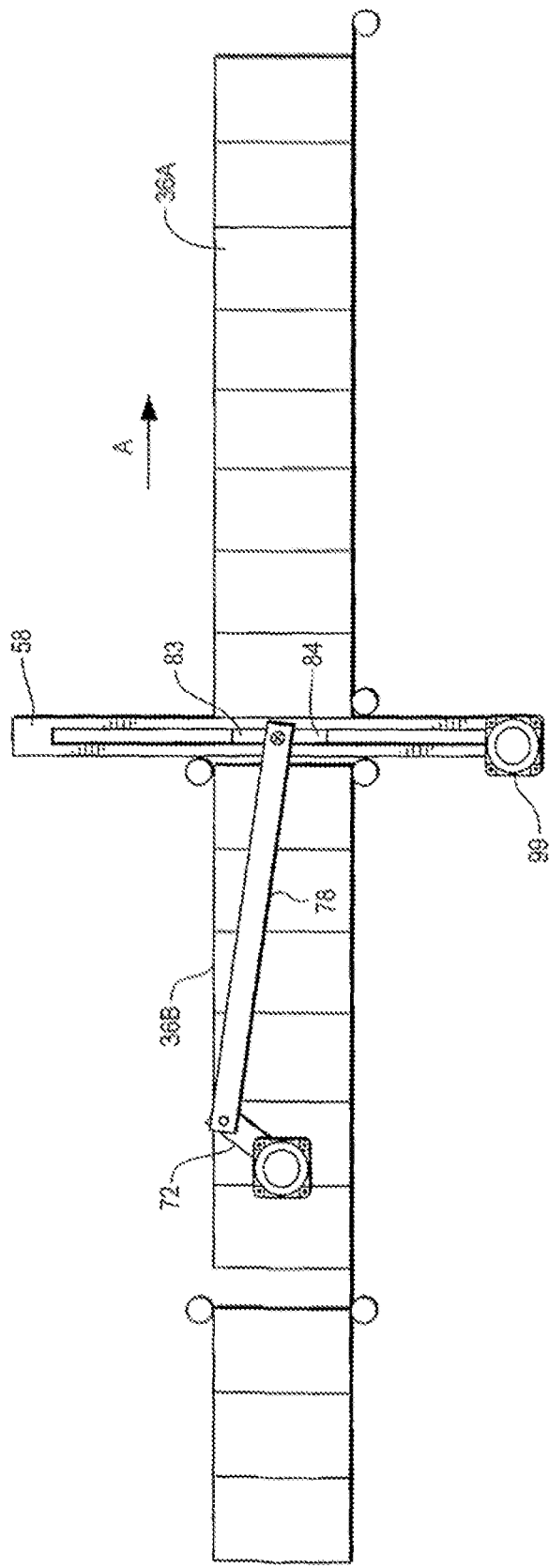

FIGS. 7 and 16 illustrate the end of the sealing step. The sealing dies remain clamped against the plastic film as the crank arms 72 and 73 move the reciprocating frame 58 downstream at the same speed as the speed at which the plastic film is advanced. The horizontal movement of the sealing dies with the plastic film provides sufficient time for the sealing dies to seal the film.

Figure 8:
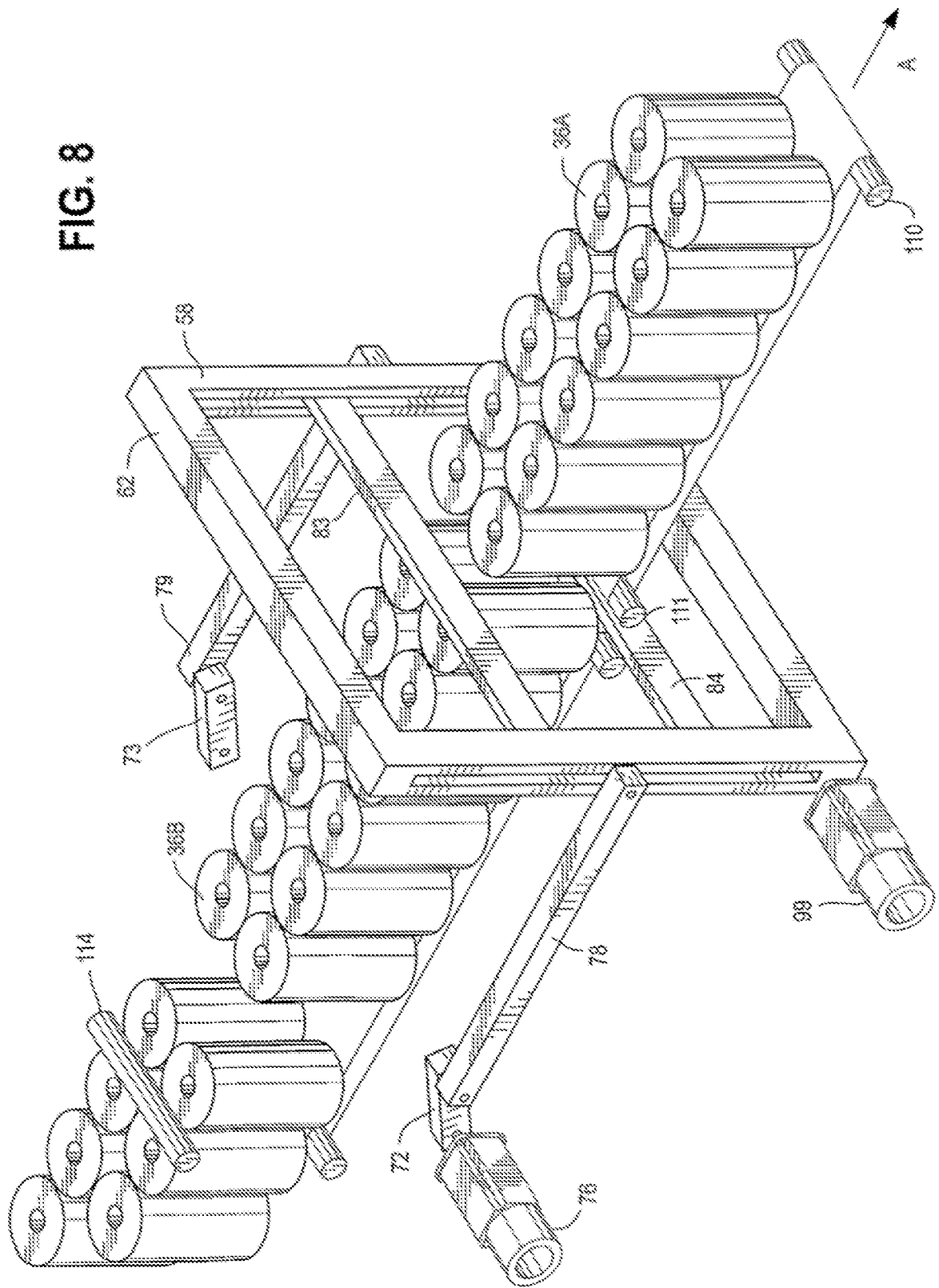
Figure 17:
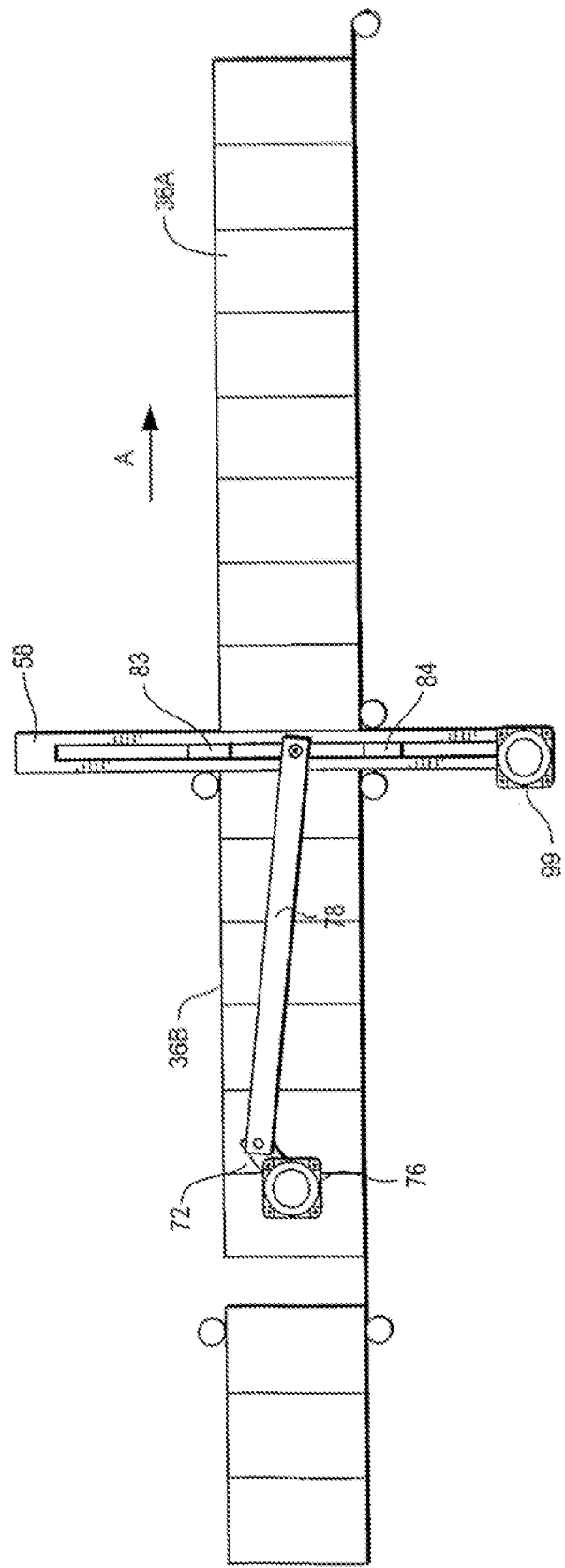

FIGS. 8 and 17 illustrate the opening of the dies toward the end of the forward movement of the reciprocating frame 58. The sealing dies are opened to permit the reverse movement of the reciprocating frame 58 past the second bundle 36B.

Figure 9:
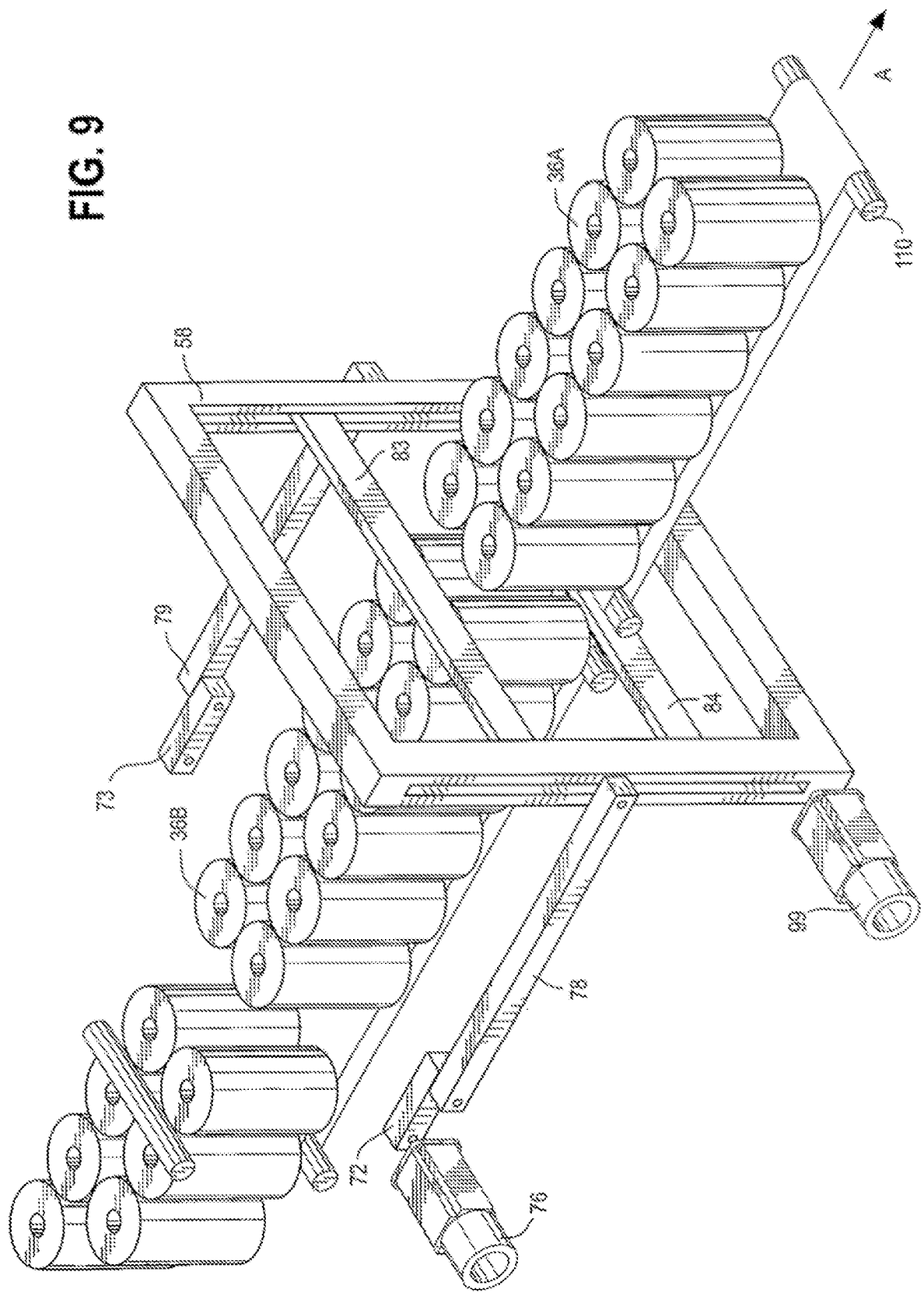
Figure 18:
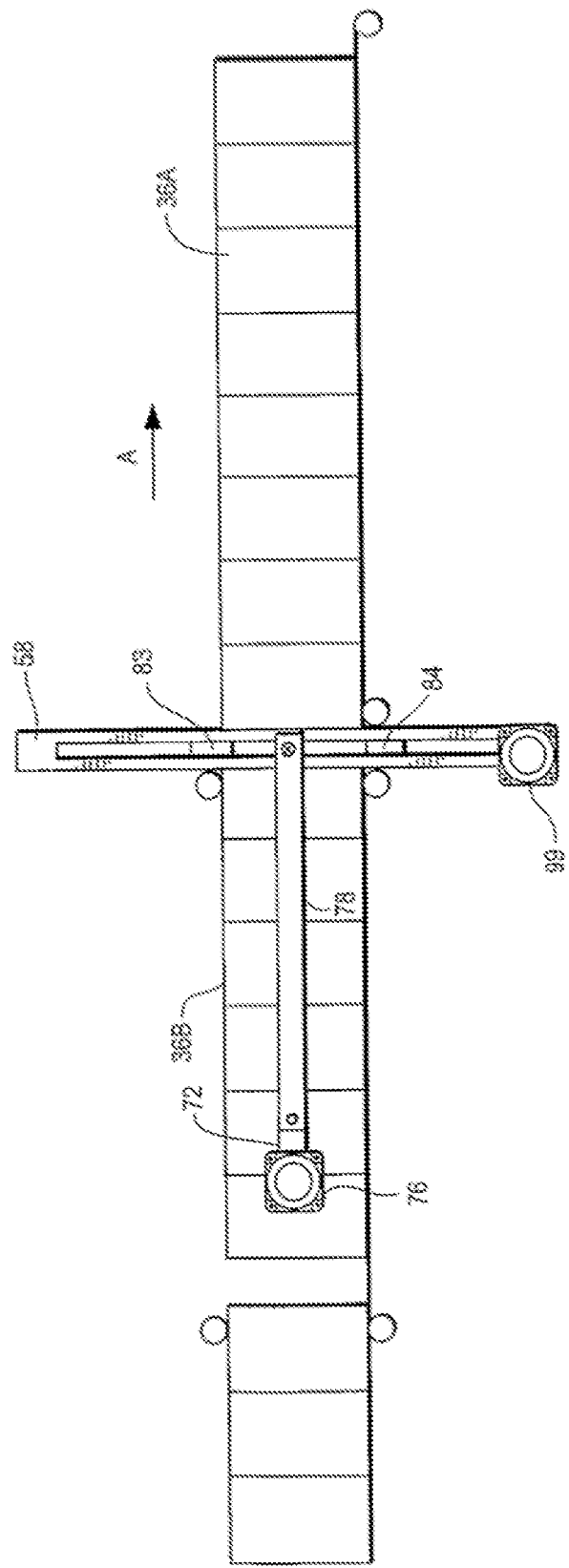

FIGS. 9 and 18 illustrate the reciprocating frame 58 at the end of its forward stroke. The sealing dies are open, and continued rotation of the crank arms 72 and 73 will begin the backward motion of the reciprocating frame.

Figure 10:
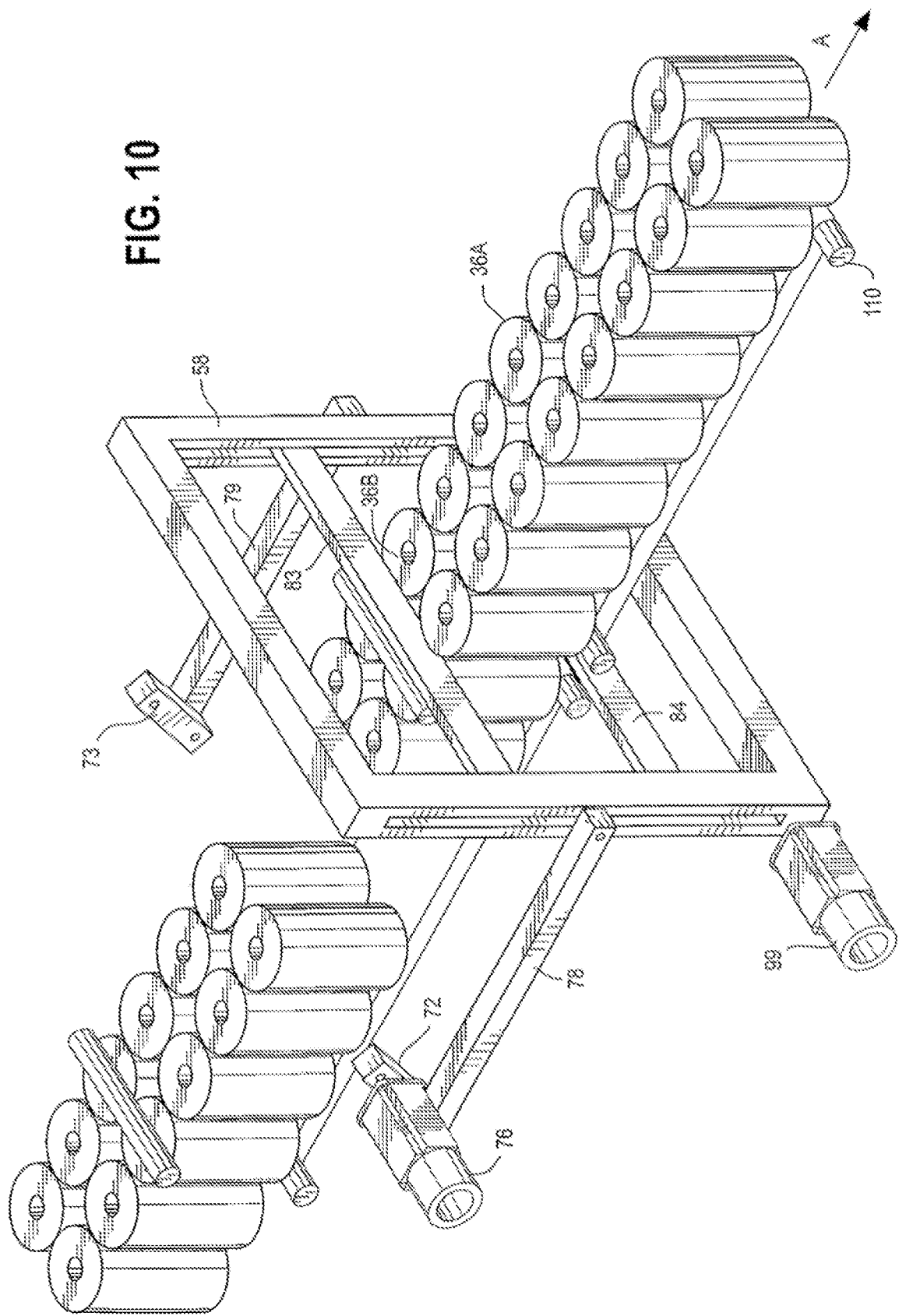
Figure 19:
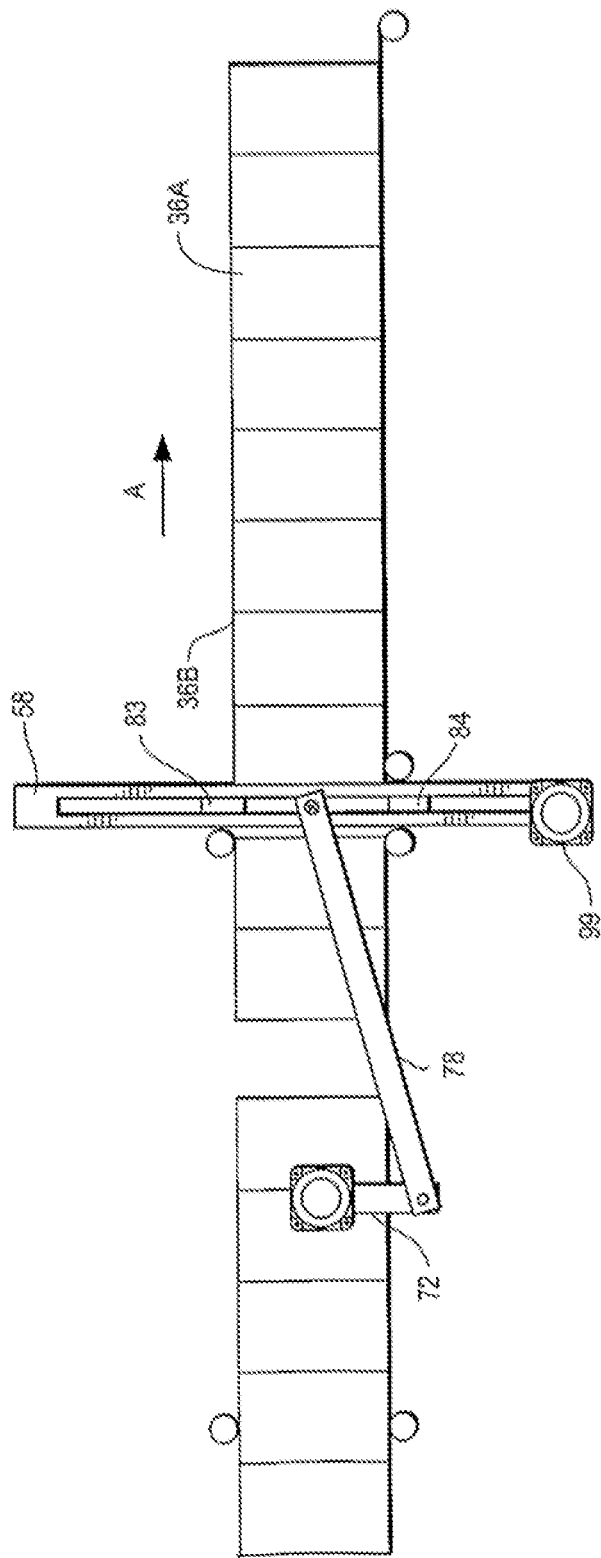

FIGS. 10 and 19 illustrate the reciprocating frame in the process of returning to its original position. The sealing dies remain open.

Figure 11:
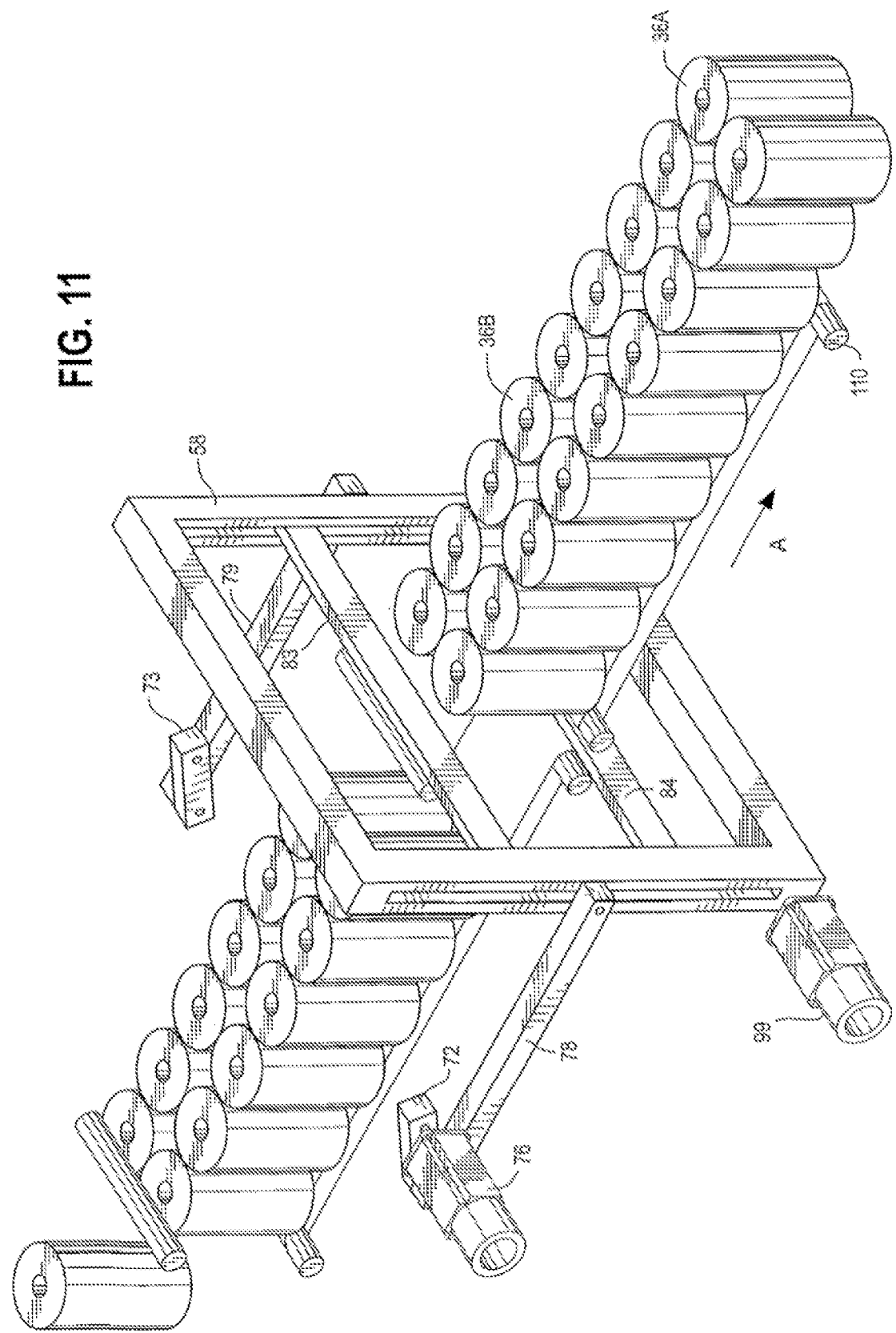
Figure 20:
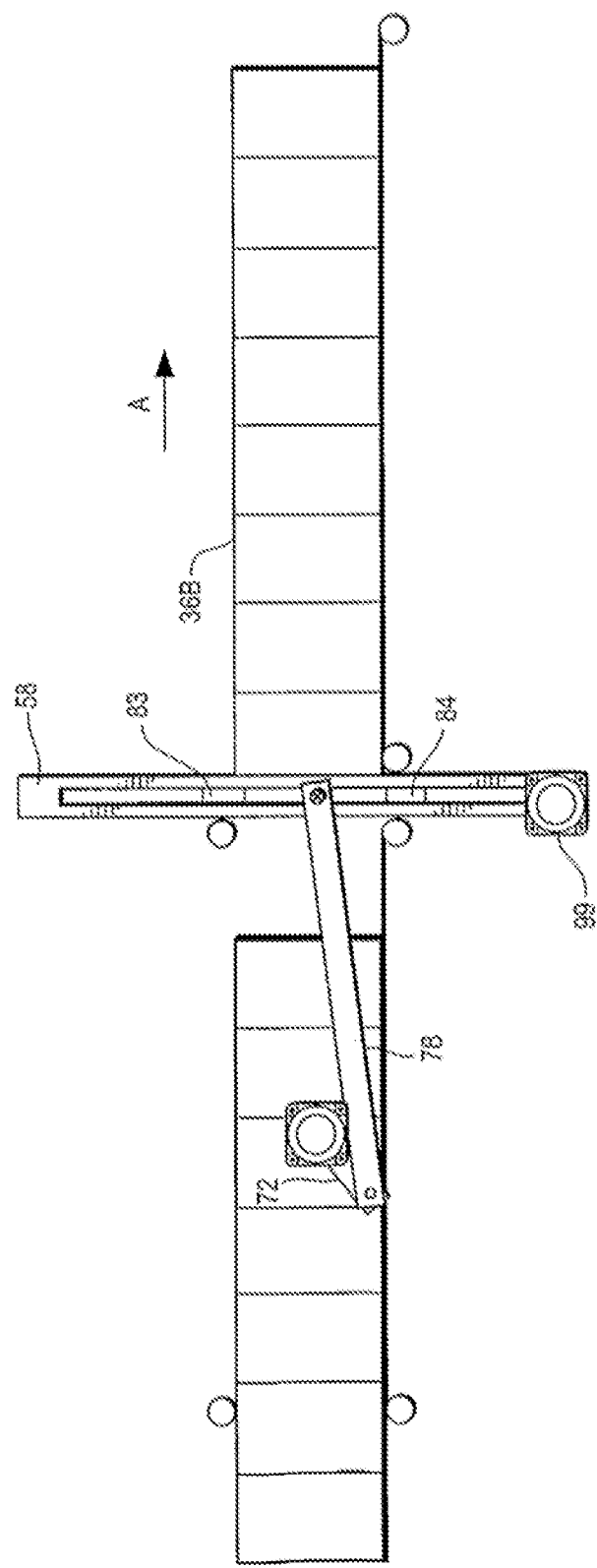

FIGS. 11 and 20 illustrate the reciprocating frame 58 near the end of its reverse stroke. The sealing dies are beginning to close as soon as they clear the exiting bundle 36B.

Figure 12:
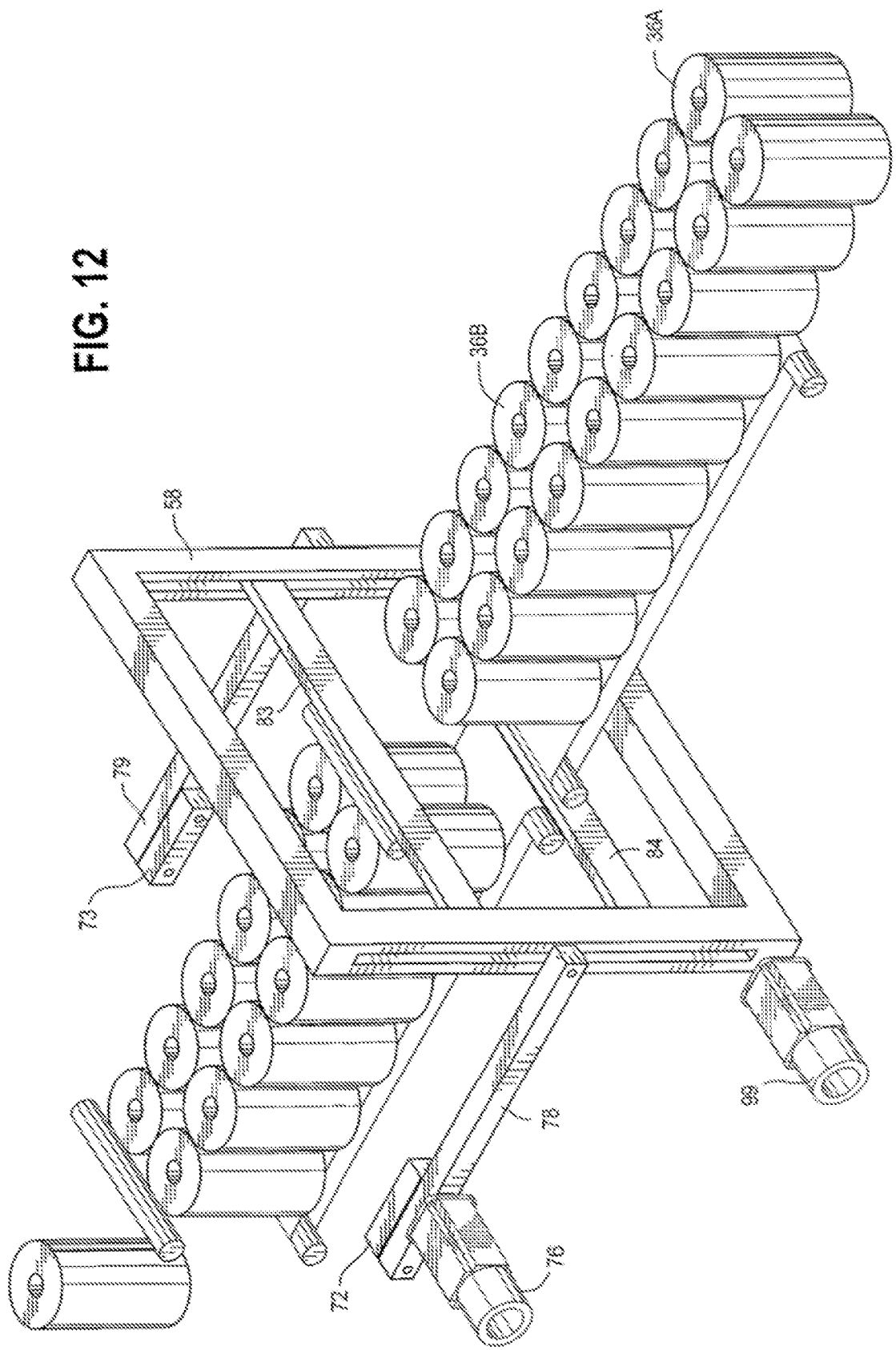
Figure 21:
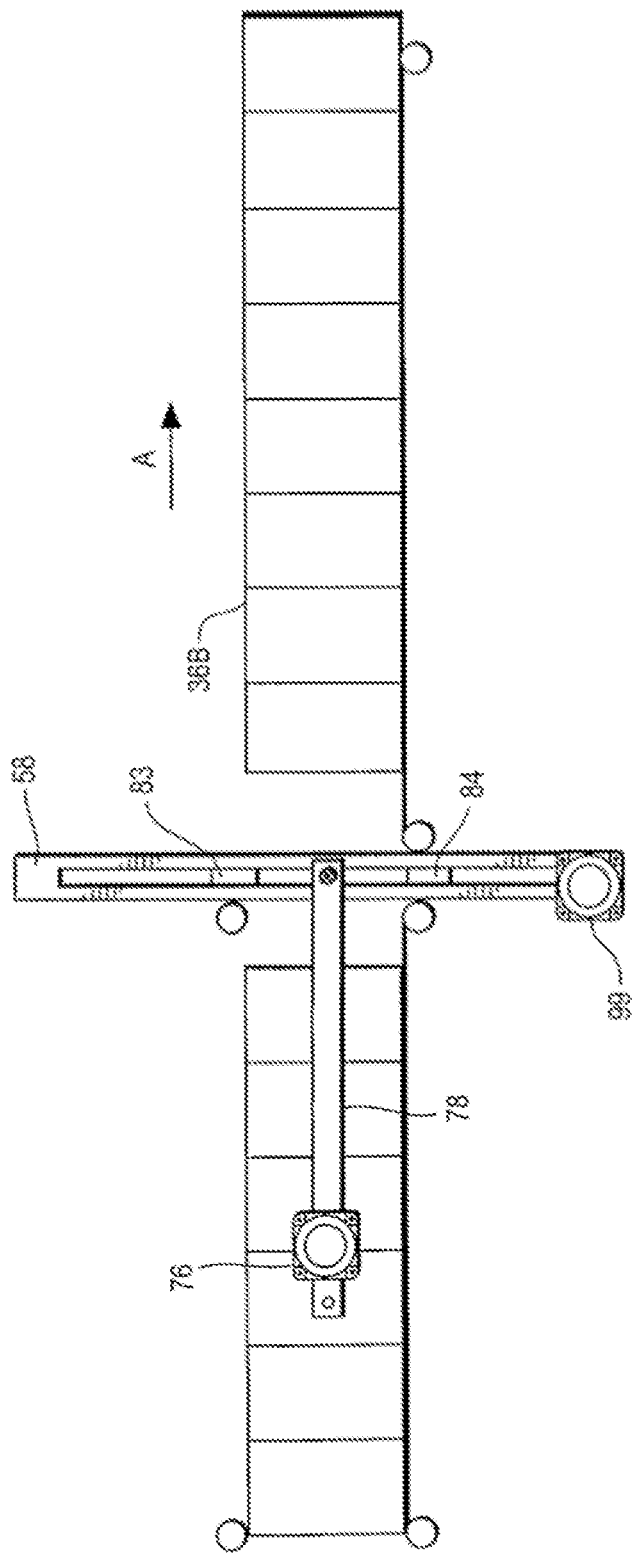

FIGS. 12 and 21 correspond to FIGS. 4 and 13 and illustrate the reciprocating frame 58 at the end of its reverse stroke and at the beginning of its forward stroke. The sealing dies are in the process of closing.

FIG. 29 illustrates one example of the path P of the movement of the upper sealing die which is caused by the combination of the linear horizontal reciprocating movement of the reciprocating frame 58 and the linear vertical reciprocating movement of the mounting bar 83. The same path P is superimposed on FIG. 2. The path of movement of the lower sealing die is the mirror image of the path P of FIG. 29.

Position 204 on path P corresponds to FIG. 4. The sealing dies are open, and the reciprocating frame 58 is in its FIG. 2 position.

The curved portion 205 of path P represents the movement of the upper sealing die as the sealing apparatus moves from its FIG. 4 position to its FIG. 6 position. The upper and lower sealing dies move toward each other as the reciprocating frame moves to the right.

Position 206 corresponds to FIG. 6. The dies are closed against the plastic film and the sealing portion of the cycle begins. Sealing continues until point 207, which corresponds to FIG. 7.

Between points 207 and 208, the dies open as the reciprocating frame continues to move to the right. At point 208, corresponding to FIG. 8, the dies are fully open.

Between points 208 and 209, the reciprocating frame 58 moves to the left to return the sealing dies toward their starting positions. Between points 209 and 204, the sealing dies begin to close as the reciprocating frame moves to its most upstream position.

In the preferred embodiments, the reciprocating frame 58 is reciprocated by a crank mechanism or by a belt drive. However, other means can be used for moving the frame back and forth along the path on which the products move.

Similarly, the preferred means for opening and closing the sealing dies includes belt drives. However, other means can be used.

Figure 31:
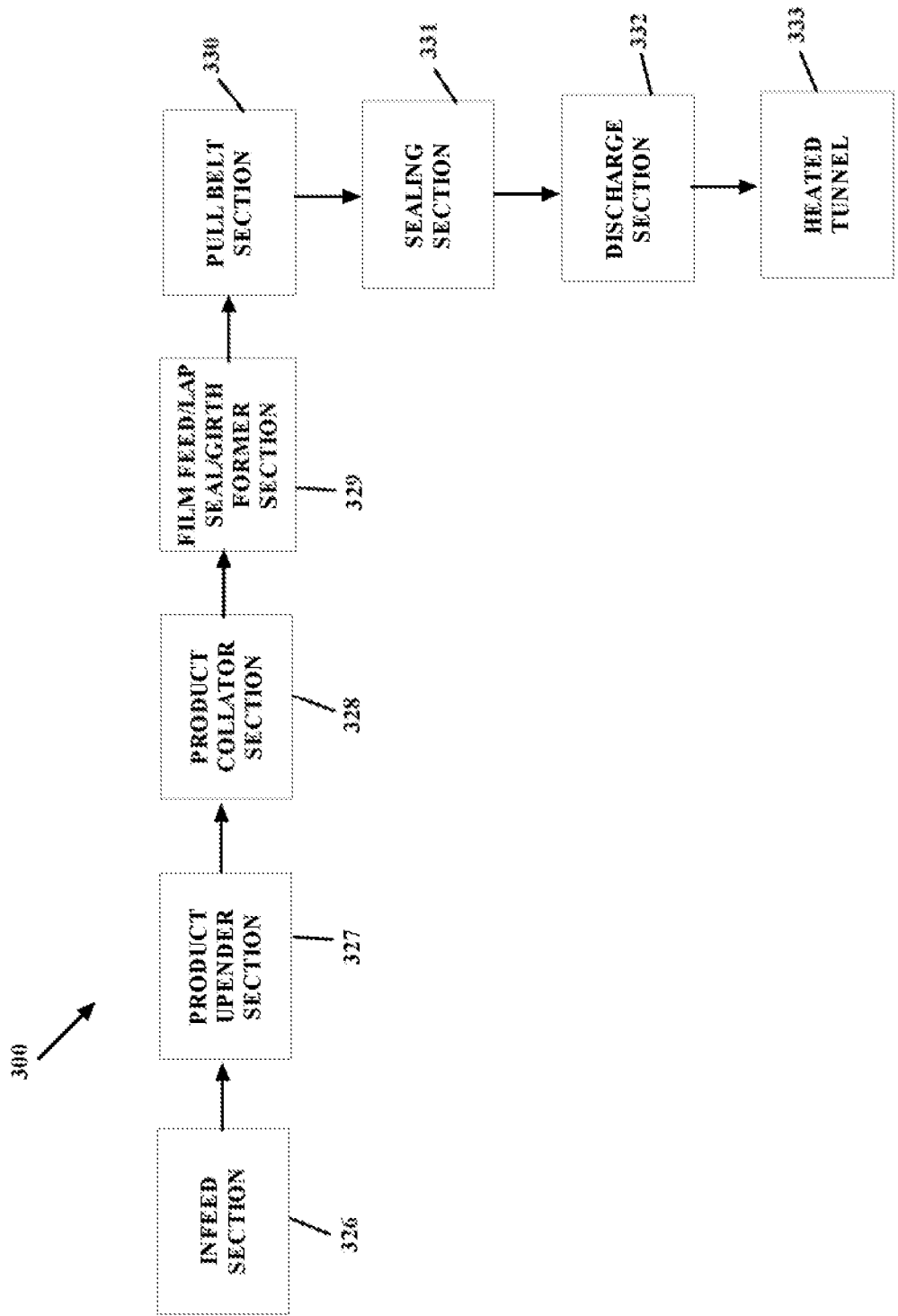
FIG. 31 is a block diagram illustrating a packaging system according to an exemplary embodiment of the present invention.

FIG. 31 is a block diagram showing a packaging system, generally designated by reference number 300, according to an exemplary embodiment of the present invention. As described in regards to the previous embodiment, the packaging system 300 includes infeed choke belt section 326, a product upender section 327, a product collator section 328, a film feed/lap seal/girth former section 329, a pull belt section 330, a sealing section 331, and a discharge section 332. The sealing section 331 also includes the various components as previous described. In the present embodiment, a heat tunnel section 333 is provided after the discharge section 332. The heat tunnel section 333 contributes to an increased bundle tightness for rolled tissue or paper towels as compared to conventional packaging systems by heat shrinking the plastic film. Conveyers transport the packaged rolled product through the heated tunnel section 333 whereby the overwrap plastic film shrinks and conforms to the contour of the article or group of articles. The articles or group of articles may or may be wrapped individually in a separate film with a higher melting point than the overwrap film to resist shrinking through the heat tunnel. Examples of heated tunnels suitable for use with the present invention are described in U.S. Pat. Nos. 8,051,629, 7,155,876, 7,823,366, 7,328,550, 7,269,929 and 345465, as well as U.S. Patent Application Publication 2014/0272747, the contents of which are incorporated herein by reference in their entirety. The heat applied in a heated tunnel can be transferred by convection, conduction, or radiation. A typical heat tunnel uses convection by blowing air heated using an electric heater.

In an exemplary embodiment of the invention, temperature of the heat treatment applied by the heat tunnel is between 300-400° F. and heat is applied to a bundled product for between 20 to 45 seconds. In an exemplary embodiment the heat is distributed primarily to the top and bottom of the bundle. The effect of this uneven heating is to produce package ends that are tight and molded while keeping the sides of the package smooth with limited wrinkles.

It should be appreciated that the heated tunnel may be used with other types of packaging systems besides those described herein to achieve improved bundle tightness.

Figure 32A:
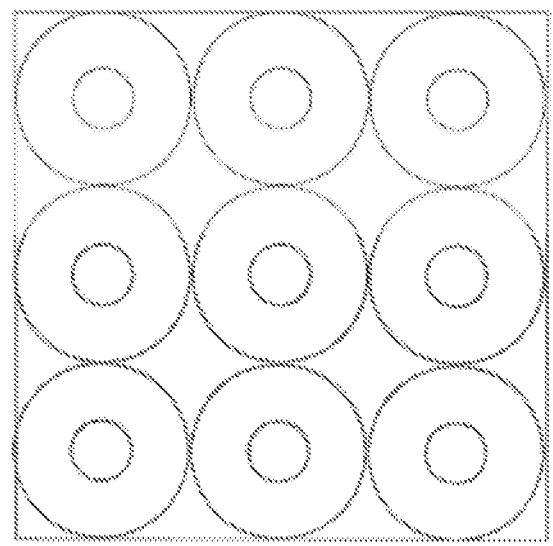
FIGS. 32A and 32B are representative diagrams showing the effects of heat treatment on a packaged bundle of paper towels according to an exemplary embodiment of the present invention.
Figure 32B:
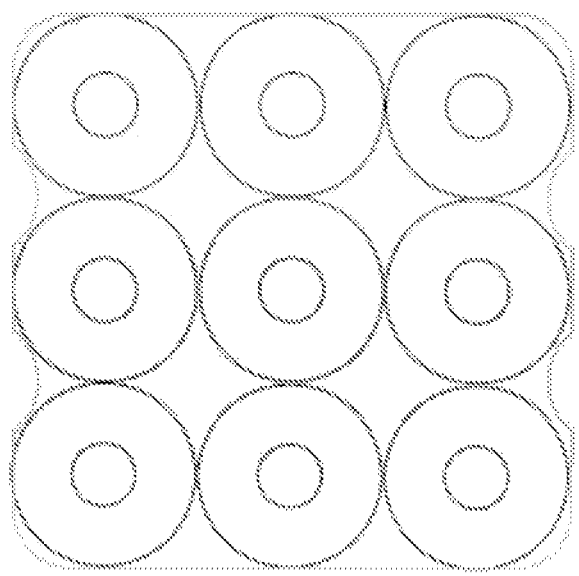

FIGS. 32A and 32B illustrate the effect of heat treatment on packaged rolls of tissue or paper towel product. As shown in FIG. 32A, prior to heat treatment, the packaging material does not break the plane of the rolls, nor does it contour the packs inside the bundle. As shown in FIG. 32B, after the heat treatment the packaging material breaks the plane of the rolls inside the bundle and contours to the shape of the inner packs.

In an exemplary embodiment of the invention, a package of paper towel rolls includes a bundle of paper towel rolls wrapped in an outer package material. The bundle may include individual packs of one or more towel rolls, with each pack wrapped with a separate package material. Each separate package material may be referred to as an inner package or "inner poly" (in the case where the package material is made of polyethylene), with the outer package material covering the entire bundle referred to as "outer poly". The package of paper towel rolls may have the following characteristics:

The package is sortable (for the purposes of the present invention, "sortable" is intended to mean that the bundle fits within sortable size dimensions (18 in×14 in×8 in)).

The package is shippable (for the purposes of the present invention, "shippable" is intended to mean that the package can be successfully transported from distributor to end consumer without any additional packaging).

Dimensions of 18"×14"×8";

Bulk of finished tissue greater than 500 microns;

Rolls inside heat treated bundle are single rolls or multi-packs, each wrapped in poly plastic, paper, or no primary packaging at all;

Cores of rolls inside the bundle are crushed flat or maintained in cylindrical shape;

Rolls inside the bundle are coreless or have a core that is between 10-60 mm in diameter;

Total square footage of paper in the bundle is between 20-32 sq. ft.;

Density of the rolls inside the bundle is between 10.7-11.3 cc/g;

Poly composition of the inner poly has a higher glass transition temperature than that of the outer poly;

Both the outer and inner poly are made from a resin that includes both high density polyethylene (HDPE) and low density polyethylene (LDPE). The poly composition for the outer poly includes a greater amount of HDPE than the poly composition for the inner poly.

Both the compositions of the inner and outer poly include an anti-static additive (such as an amine with ethoxylated surfactants). The composition of the outer poly has a lower percentage of anti-static resin than that of the inner poly. The distribution of anti-static resin in the inner poly is higher on the surface of the inner poly facing the outer poly than it is on the surface of the inner poly facing the rolled product.

The composition of the inner poly has a higher percentage of antiblock additives (such as calcium carbonate, sodium carbonate, or talc) than the composition of the outer poly. The composition of the inner poly has a higher percentage of slip additives (such as long chain fats) than the composition of the outer poly.

Poly thickness of the outer poly is 1.0 mils to 3.5 mils as measured using Test Method ASTM D6988-13. The outer poly can be made from 3 to 5 layers. Preferably, a center layer contains a higher percentage of HDPE than the outer layers. The outer poly preferably has a puncture resistance of between 600 and 1,200 gf and more preferably has a puncture resistance of between 800 and 1200 gf.

In an exemplary embodiment of the invention, the crystallinity of the outer poly is lower after it has gone through the heating process in the heat tunnel than it was prior to the heating process. As discussed above, when the outer poly is heated evenly so as to the keep the sides smooth and the top and bottom ends tight, the film in the top and bottom ends will become significantly more rigid and less stretchable.

In an exemplary embodiment, a circumference of the outer poly prior to being heat treated is about 25 mm or more greater than the circumference of the bundle. After heat treatment, the circumference of the outer poly is reduced such that it is about 10 mm or more smaller than the prior circumference of the bundle.

In an exemplary embodiment, a stock keeping unit (SKU) in the form of a barcode, for example, is printed or otherwise directly disposed on the outer package material. The SKU is readable directly from the outer package so that additional outer packaging, such as a box, is not required. Graphics on the outer package may be adjusted so that they are visually correct after the packaging is heat treated.

In an exemplary embodiment, the inner and/or outer poly may include a dyed central layer. Without being bound by theory, it is believed that the use of a dyed layer in lieu of surface printing to provide color and/or graphics to the inner poly allows for more control of the interface between the facing surfaces of the inner and outer poly.

In an exemplary embodiment, each of the paper product rolls within the bundle has a Kershaw Firmness of less than 4 mm, where the Kershaw firmness is determined using a Kershaw Roll Density Tester Model RDT-2000B from Kershaw Instrumentation 517 Auburn Ave. Swedesboro, N.J., USA 08085 as follows:

1. Procedure
   1.1. Turn the Roll Density Tester on and allow it to warm up for about 15 minutes.
   1.2. Make sure the Run/Calibrate switch is in the "RUN" position.
   1.3. Place the roll to be tested on the test spindle.
   1.4. Adjust the roll diameter assembly until the pointer indicates the nominal diameter of the roll being tested. (The roll diameter needs to be converted to inches to set the pointer for the machine diameter.)
   1.5. Press the "GREEN" forward button, the table will automatically move toward the roll to be tested. Once the probe contacts the roll, the force exerted on the probe will be displayed on the digital force display. The results for the displacement and force will be displayed.

In an exemplary embodiment, each of the paper product rolls within the bundle has a roll density between 9.5 cc/g to 12 cc/g. The roll density is determined by the following procedure:

Calculate the volume of tissue within the tissue roll. In order to do this; first measure the circumference of the roll using Pi tape. Once the circumference of the roll is determined, the radius of the roll can be calculated using the formula Circumference=2*Pi*radius. Once the roll radius is determined, then calculate the roll volume using the formula for volume of a cylinder: Volume=Pi*radius squared*Height. Next, we need to remove the volume occupied by the core to arrive at the volume of the tissue itself. Remove the core by unwinding the paper and repeat the calculation above to determine the volume of the core. Next subtract the core volume from the total roll volume to arrive at the volume of paper in the roll. The unit of length used should be centimeters to arrive at a cubic centimeter volume.

Next; using samples of the unwound paper, calculate the grammage or basis weight of the tissue product. Using a dye and press, six 76.2 mm by 76.2 mm square samples are cut from the tissue product being careful to avoid any web perforations. The samples are placed in an oven at 105 deg C. for 5 minutes before being weighed on an analytical balance to the fourth decimal point. The weight of the sample in grams is divided by (0.0762 m)^2 to determine the basis weight in grams/m^2. Using units conversions, convert this to grams/cm^2.

Next, calculate the total square centimeters of paper in the tissue roll by multiplying the area of a single sheet of the tissue by the number of sheets in the roll. Units used should be square centimeters.

Next, multiply the area of paper in the roll in square centimeters by the grammage in grams/square centimeter to obtain the weight, in grams, of paper in the roll.

Finally divide the weight of paper in the roll by the volume of paper in the roll to obtain the roll density in grams/cubic centimeter.

Figure 33:
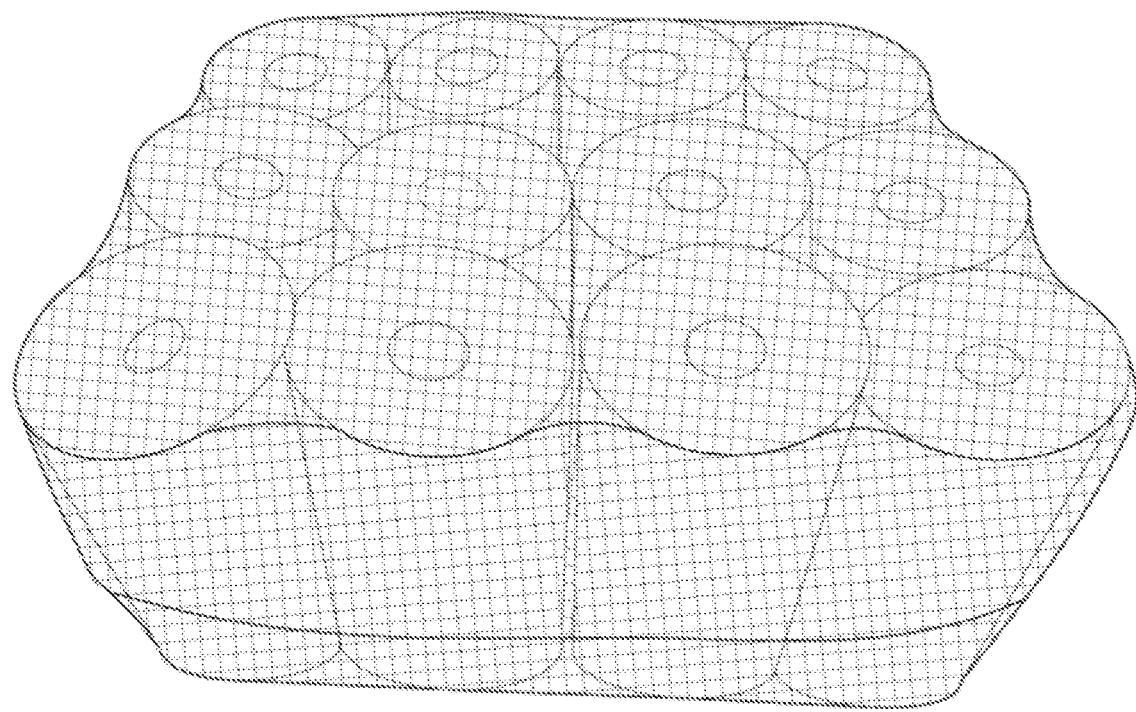
FIG. 33 is a perspective view of a packaged bundle of paper towels according to an exemplary embodiment of the present invention.
Figure 34:
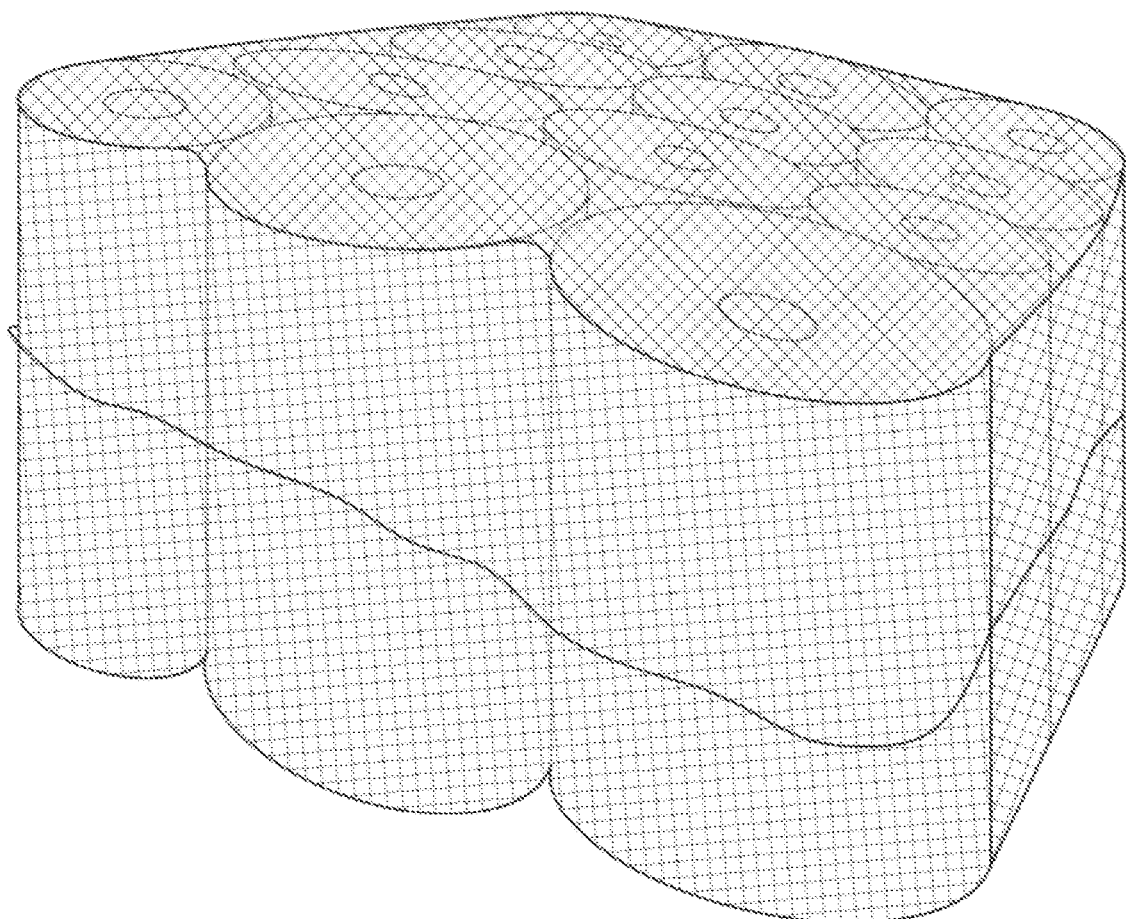
FIG. 34 is a perspective view of a corner section of the packaged bundle shown in FIG. 32.

In an exemplary embodiment, the outer poly has a shrinkage factor of less than zero relative to the bundle. The shrinkage factor is determined as follows:

a. Cut the outer poly parallel to the lap seal;
b. Measure length of outer poly perpendicular to lap seal;
c. Measure length of path around bundle in the same direction (perpendicular to lap seal direction, without taking into account indents between rolls);
d. Calculate shrinkage factor as follows:

shrinkage factor=measured outer poly length−measured length of path around bundle FIGS. 32 and 33 show different views of a packaged bundle of paper towels according to an exemplary embodiment of the present invention. As shown, the outer packaging material generally conforms to the shape of paper towels contained within the bundle due to the synergistic effect of the backing plate and heat treatment. While not shown, the bundled paper towels can also be arranged in an interlocking manner, with the rows offset from each other.

While in the foregoing specification a detailed description of a specific embodiment of the invention was set forth, it will be understood that many of the details herein given may be varied considerably by those skilled in the art without departing from the spirit and scope of the invention.

The invention claimed is:

1. A shippable bundled product comprising:
a plurality of paper product rolls each individually packaged by a first package material and arranged relative to one another to form a bundle, each of the plurality of paper product rolls having a roll density between 9.5 cc/g to 12 cc/g,
the bundle being packaged by a second package material that is heat shrunk relative to the first package material, wherein:
the second package material has a shrinkage factor relative to the bundle of less than zero so that the second package material protrudes into spaces between the paper product rolls,
a circumference of the second package material prior to heat shrinking is 25 mm or greater than a circumference of the bundle,
the circumference of the second package material after heat shrinking is 10 mm or smaller than the circumference of the bundle,
during the heat shrinking, more heat is applied to a top and a bottom of the bundle as compared to sides of the bundle,
the first package material comprises high density and low density polyethylene, and
the second package material comprises high density and low density polyethylene.

2. The product of claim 1, wherein the second package material has a higher quantity of high density polyethylene as compared to the first package material.

3. The product of claim 1, wherein the second package material comprises one or more outer layers that are comprised of 10-100% polypropylene.

4. The product of claim 1, wherein at least one of the first and second package materials comprise laminated layers of polypropylene film.

5. The product of claim 1, wherein the first package material has a higher percentage of anti-block resin as compared to the second package material.

6. The product of claim 1, wherein the second package material comprises a number of layers within the range of 3 to 5.

7. The product of claim 6, wherein a center layer of the second package material comprises a higher percentage of high density polyethylene as compared to outer layers of the second package material.

8. The product of claim 1, wherein the first package material has a higher quantity of anti-block resin on a side in contact with the second package material as compared to a side in contact with the individually packaged paper product rolls.

9. The product of claim 1, wherein a puncture resistance of the second package material is between 800-1200 gf.

10. The product of claim 1, wherein the second package material has a thickness between 1.0 to 3.5 thousands of an inch.

11. The product of claim 1, wherein the individually packaged paper product rolls are arranged relative to one another in a staggered/interlocking stacking pattern.

12. The product of claim 1, wherein the second package material is subjected to heat treatment.

13. The product of claim 12, wherein the second package material has a lower crystallinity after the heat treatment.

14. The product of claim 12, wherein the second package material has a surface area that is lower after the heat treatment.

15. The product of claim 12, wherein a temperature range of the heat treatment is between 300-400 degrees Fahrenheit.

16. The product of claim 12, wherein a duration of the heat treatment is between 20 to 45 seconds.

17. The product of claim 12, wherein the second package material exhibits anisotropic properties after heat treatment.

18. A shippable bundled product comprising:
- a plurality of paper product rolls each individually packaged by a first package material and arranged relative to one another to form a bundle, paper product that makes up the plurality of paper product rolls having a bulk greater than 400 microns, each of the plurality of paper product rolls having a diameter less than 122 mm, a roll width equal to or greater than 4 inches, and a roll density between 9.5 cc/g to 12 cc/g,
- the bundle being packaged by a second package material that is heat shrunk relative to the first package material, wherein:
- a circumference of the second package material prior to heat shrinking is 25 mm or greater than a circumference of the bundle,
- the circumference of the second package material after heat shrinking is 10 mm or smaller than the circumference of the bundle,
- during the heat shrinking, more heat is applied to a top and a bottom of the bundle as compared to sides of the bundle,
- the second package material has a shrinkage factor relative to the bundle of less than zero so that the second package material protrudes into spaces between the paper product rolls, and
- the first package material comprises high density and low density polyethylene and the second package material comprises high density and low density polyethylene.

19. The product of claim 18, wherein each of the plurality of paper product rolls has a Kershaw Firmness of less than 4 mm.

20. A shippable bundled product comprising:
- a plurality of paper product rolls each individually packaged by a first package material and arranged relative to one another to form a bundle, each of the plurality of paper product rolls having a roll density between 9.5 cc/g to 12 cc/g,
- the bundle being packaged by a second package material that is heat shrunk relative to the first package material, the second package material having a melting point between 120 and 140 deg C,
- wherein:
- a circumference of the second package material prior to heat shrinking is 25 mm or greater than a circumference of the bundle,
- the circumference of the second package material after heat shrinking is 10 mm or smaller than the circumference of the bundle,
- during the heat shrinking, more heat is applied to a top and a bottom of the bundle as compared to sides of the bundle,
- the second package material has a shrinkage factor relative to the bundle of less than zero so that the second package material protrudes into spaces between the paper product rolls, and
- the first package material comprises high density and low density polyethylene and the second package material comprises high density and low density polyethylene.

* * * * *